(12) United States Patent
Nakazawa et al.

(10) Patent No.: US 9,994,013 B2
(45) Date of Patent: Jun. 12, 2018

(54) COMPOSITE APPARATUS

(71) Applicant: SEIKO EPSON CORPORATION, Tokyo (JP)

(72) Inventors: Akira Nakazawa, Azumino (JP); Yoshikane Tsuchihashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/501,780

(22) PCT Filed: Jul. 31, 2015

(86) PCT No.: PCT/JP2015/003884
§ 371 (c)(1),
(2) Date: Feb. 3, 2017

(87) PCT Pub. No.: WO2016/021171
PCT Pub. Date: Feb. 11, 2016

(65) Prior Publication Data
US 2017/0225453 A1    Aug. 10, 2017

(30) Foreign Application Priority Data

Aug. 5, 2014  (JP) ................................ 2014-159254
Apr. 16, 2015  (JP) ................................ 2015-083971

(51) Int. Cl.
*B41J 2/00*     (2006.01)
*B41J 2/01*     (2006.01)
(Continued)

(52) U.S. Cl.
CPC . *B41J 2/01* (2013.01); *B41J 2/00* (2013.01); *B41J 2/17506* (2013.01); *B41J 2/17509* (2013.01);
(Continued)

(58) Field of Classification Search
CPC ........ B41J 2/00; B41J 2/01; B41J 2/175; B41J 2/17509; B41J 2/17516; B41J 29/13
See application file for complete search history.

(56) References Cited

U.S. PATENT DOCUMENTS 7,008,051 B2 *  3/2006  Akermalm ........... B41J 2/17509
                                                                347/85
7,360,877 B2 *  4/2008  Ikezaki ................ B41J 2/17509
                                                                347/85
(Continued)

FOREIGN PATENT DOCUMENTS

JP  2003-205624   7/2003
JP  2004-304414   10/2004
(Continued)

OTHER PUBLICATIONS

International Search Report dated Oct. 6, 2015 for PCT/JP2015/003884.

*Primary Examiner* — Anh T. N. Vo
(74) *Attorney, Agent, or Firm* — Workman Nydegger

(57) ABSTRACT

A composite apparatus includes a recording device, a reading device that is disposed on the recording device and is able to read an image, a recording portion that is disposed within the recording device and is able to perform printing by ejecting ink on a paper sheet P, and a liquid accommodating portion that is disposed on a side portion of the recording device and which accommodates the ink to be supplied to the recording portion, in which the reading device is disposed such that a part of the reading device protrudes from the recording device to above the liquid accommodating portion.

12 Claims, 25 Drawing Sheets

(51) Int. Cl.
*B41J 29/13* (2006.01)
*B41J 2/175* (2006.01)

(52) U.S. Cl.
CPC ....... *B41J 29/13* (2013.01); *H04N 2201/0008* (2013.01)

(56) References Cited

U.S. PATENT DOCUMENTS

| | | | | |
|---|---|---|---|---|
| 7,567,354 | B2 * | 7/2009 | Shirai | H04N 1/32443 358/1.12 |
| 8,087,764 | B2 * | 1/2012 | Niimi | B41J 3/543 347/85 |
| 8,678,567 | B2 * | 3/2014 | Shimizu | B41J 2/17523 347/85 |
| 8,870,349 | B2 * | 10/2014 | Koizumi | B41J 2/17526 347/50 |
| 9,409,403 | B2 * | 8/2016 | Koike | B41J 2/175 |
| 2004/0190084 | A1 | 9/2004 | Shirai | |
| 2007/0223060 | A1 | 9/2007 | Ikeno et al. | |
| 2012/0250116 | A1 | 10/2012 | Ikeno et al. | |
| 2013/0094066 | A1 | 4/2013 | Sakanashi et al. | |
| 2013/0114116 | A1 | 5/2013 | Ikeno et al. | |

FOREIGN PATENT DOCUMENTS

| | | |
|---|---|---|
| JP | 2007-067605 | 3/2007 |
| JP | 2012-152996 | 8/2012 |
| JP | 2013-088593 | 5/2013 |
| JP | 2013-144423 | 7/2013 |
| JP | 2013-226726 | 11/2013 |
| JP | 2015-066822 | 4/2015 |
| WO | 2005-102710 | 11/2005 |
| WO | 2015-029405 | 3/2015 |

\* cited by examiner

COMPOSITE APPARATUS

TECHNICAL FIELD

The present invention relates, for example, to a composite apparatus that is provided with a recording device such as an ink jet printer.

BACKGROUND ART

From the related art, as a type of recording device, an ink jet printer is known which performs printing by ejecting ink from an ink jet head onto a recording medium such as a paper sheet. In such a printer, in order to supply ink continuously and stably to the ink jet head in a case where a relatively large amount of printing is performed, a configuration is suggested in which ink is supplied to the ink jet head through an ink tube from an ink tank with a relatively large accommodation capacity for ink (for example, refer to PTL 1). In the printer with such a configuration, ordinarily, the ink tank is attached to a side surface of a device main body.

CITATION LIST

Patent Literature

PTL 1: Japanese Unexamined Patent Application Publication No. 2012-152996

SUMMARY OF INVENTION

Technical Problem

Note that, in the printer as described above, ordinarily, since the height of the ink tank is slightly lower than the height of the device main body, when the ink tank is attached to the side surface of the device main body, there is a problem in that a wasted space is generated on the ink tank.

The present invention has been made in view of the problem existing in the related art. An object of the present invention is to provide a composite apparatus that is able to make efficient use of the space on a liquid accommodating portion that is provided on a side portion of the device main body.

Solution to Problem

Hereinafter, means for solving the problem and operation effects thereof will be described.

In order to solve the problem, there is provided a composite apparatus including a recording device that has a recording portion which performs recording by ejecting liquid onto a recording medium, a reading device that is disposed on the recording device and able to read an image, and a liquid accommodating portion of which at least a part is disposed on a side portion of the recording device and which accommodates the liquid to be supplied to the recording portion, in which the reading device is disposed such that a part of the reading device protrudes from the recording device above the liquid accommodating portion.

According to the configuration, since the part of the reading device is disposed so as to protrude from the recording device above the liquid accommodating portion, it is possible to efficiently use the space on the liquid accommodating portion that is provided to the side portion of the recording device.

In the composite apparatus, the liquid accommodating portion has a finger hooking portion which a finger hooks.

According to the configuration, when the composite apparatus is lifted up and transported, it is possible to reduce shear stress applied to a joining portion that joins the liquid accommodating portion and the recording device.

In the composite apparatus, the reading device has a transport portion that transports a document, and a reading portion that reads an image of the transported document, and the transport portion is positioned on the recording device.

According to the configuration, it is possible to provide a transport portion with a large weight proportion that occupies the reading device with a stable posture. In addition, it is possible to suppress a reduction of image quality that is read by the reading portion.

In the composite apparatus, it is preferable that the size of the image that is able to be read by the reading device is larger than the size of the recording medium that is able to be recorded by the recording portion.

According to the configuration, it is possible to read the image that is larger than the recording medium using the reading device.

In the composite apparatus, it is preferable that the liquid accommodating portion is disposed on both side portions of the recording device in a width direction.

According to the configuration, it is possible to increase the size of the reading device in the width direction of the recording device.

In the composite apparatus, it is preferable that the recording medium has a rectangular shape, the recording device is configured to be able to set the recording medium in a positional state in which a depth direction of the recording device is a long side, and the reading device is able to read the image with a rectangular shape which has an area that is two times the size of the recording medium and in which the width direction that is orthogonal to the depth direction of the recording device is a long side.

According to the configuration, it is possible to space efficiently dispose the reading device that is able to read the image with the area that is two times the size of the recording medium by realizing the width of the width direction using the liquid accommodating portion.

In the composite apparatus, it is preferable that an upper end portion of the liquid accommodating portion is a horizontal plane.

According to the configuration, it is possible to suppress the liquid accommodating portion from interfering with the reading device.

In the composite apparatus, it is preferable that the liquid accommodating portion is disposed on a rear side portion of the recording device.

According to the configuration, it is possible to increase the size of the reading device in the depth direction of the recording device.

In the composite apparatus, it is preferable that the liquid accommodating portion is provided with an insertion case that has an insertion port into which it is possible to insert a liquid accommodating body that accommodates the liquid, and the insertion port is disposed on a side portion of the insertion case.

According to the configuration, it is possible to suppress the reading device from being an obstacle when the liquid accommodating body is inserted in and removed from the insertion port.

In the composite apparatus, it is preferable that the liquid accommodating portion is provided with an accommodating case that is able to accommodate the liquid accommodating body in which the liquid is accommodated and has an opening portion in a side portion and a lid that is able to open and close the opening portion, and an opening and closing trajectory when the lid is opened and closed is separated from the reading device.

According to the configuration, it is possible to suppress the reading device from being an obstacle when the lid is opened and closed.

In the composite apparatus, it is preferable that the liquid accommodating portion is provided with a storage case that has the opening portion on the top side and is able to store the liquid accommodating body in which the liquid is accommodated, and the reading device is provided with a reading surface on which the image is able to be read and a cover member that is displaceable between a first position at which the reading surface is covered and a second position at which the reading surface is exposed, and the cover member closes the opening portion when at the first position and opens the opening portion when at the second position.

According to the configuration, it is possible to cause the cover member of the reading device to function as a lid that opens and closes the opening portion of the storage case.

In the composite apparatus, it is preferable that in the width direction, one liquid accommodating portion out of the liquid accommodating portions that are disposed on both side portions of the recording device is longer than the other liquid accommodating portion, and the protrusion amount of the reading device that protrudes from the recording device to above the one liquid accommodating portion is longer than the protrusion amount of the reading device that protrudes from the recording device to above the other liquid accommodating portion.

According to the configuration, it is possible to stably support the reading device using the recording device.

DESCRIPTION OF EMBODIMENTS

Embodiment 1

An embodiment of a composite apparatus is described below with reference to the accompanying drawings.

Figure 1:
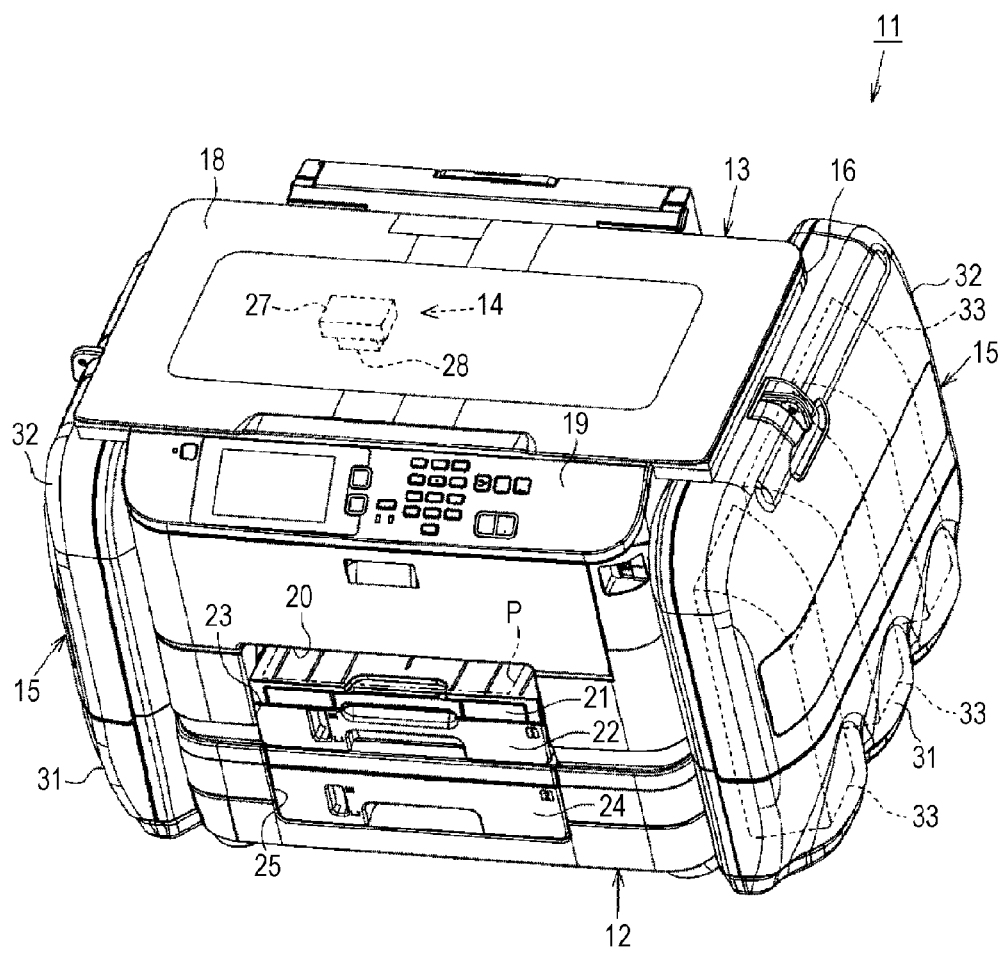
FIG. 1 is a perspective view of a composite apparatus of one embodiment.

As shown in FIG. 1, a composite apparatus 11 is a substantially rectangular shape as a whole and is provided with a reading device 13 that is disposed on a recording device (device main body) 12, and able to read an image, and a recording portion 14 that is disposed within the recording device 12 and is able to perform printing (recording) by ejecting ink as one example of liquid onto a paper sheet P as an example of a recording medium. Furthermore, the composite apparatus 11 is provided with liquid accommodating portions 15 which are disposed on both side portions of the recording device 12 in a width direction X and accommodate ink to be supplied to the recording portion 14 via an ink supply tube (illustration omitted).

Figure 2:
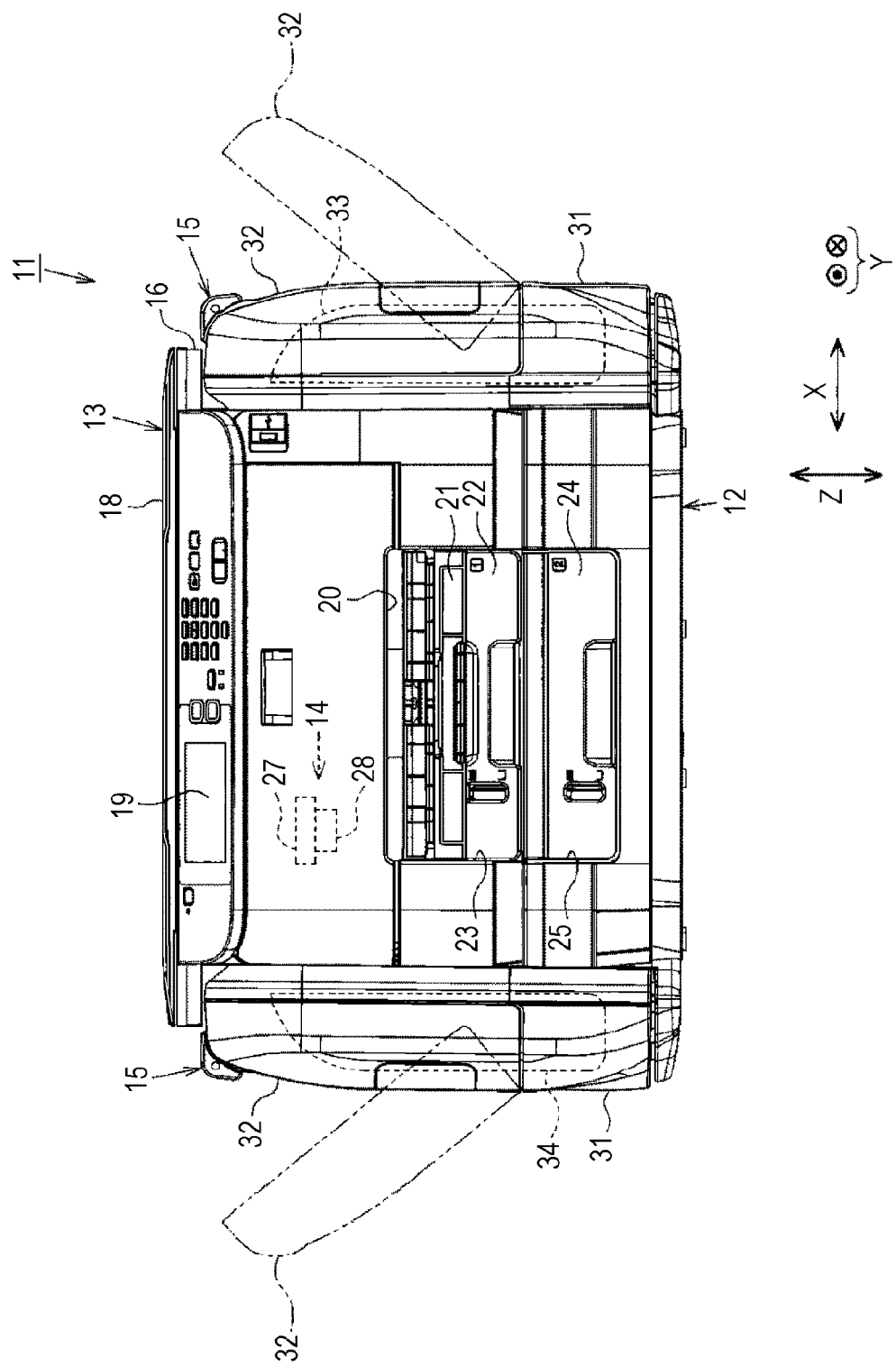
FIG. 2 is a front surface view of the composite apparatus.

As shown in FIGS. 1 and 2, the reading device 13 is configured by a so-called flatbed type scanner with a rectangular plate shape, and both end portions in the width direction X that is along the long side are disposed to protrude from the recording device 12 above each liquid accommodating portion 15. The upper end portion of each liquid accommodating portion 15 is a horizontal plane shape, and a small gap is formed between both end portions of the reading device 13 and the upper end portion of each liquid accommodating portion 15. In this case, both end portions of the reading device 13 in the width direction X are positioned further inside than an outside surface of each liquid accommodating portion 15 in the width direction X.

Figure 3:
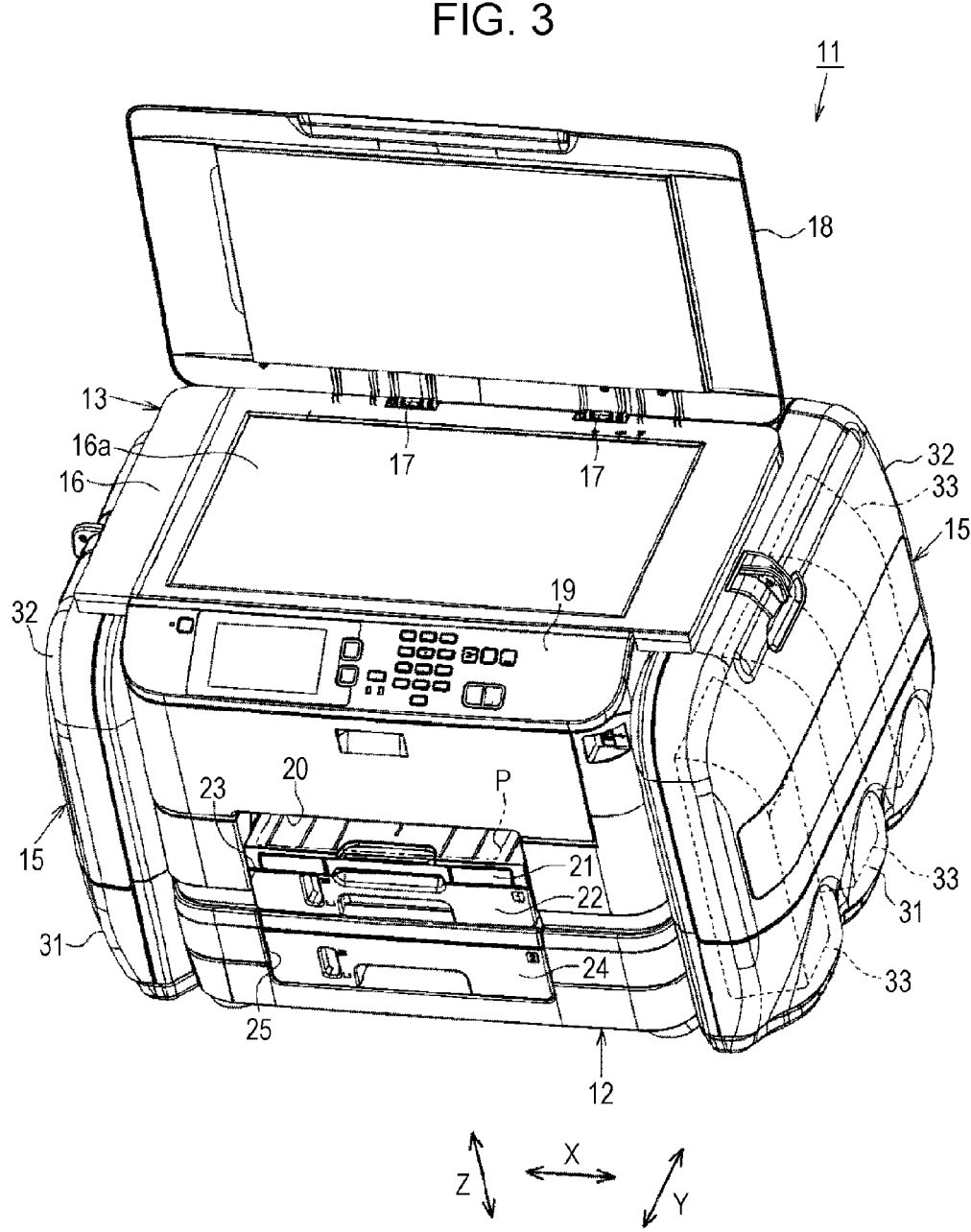
FIG. 3 is a perspective view of the composite apparatus when a cover member is at a second position.

As shown in FIGS. 1 and 3, the reading device 13 is provided with a reading device main body 16 that has a reading surface 16a that reads an image by mounting a document or the like thereon, and a cover member 18 that is attached to the reading device main body 16 to be able to rotate via a hinge portion 17 that is provided on a rear end portion of the reading device main body 16. The cover member 18 is configured to be able to rotate (displace) between a first position (position indicated in FIG. 1) at which the entirety upper surface of the reading device main body 16 that includes the reading surface 16a is covered and a second position (position indicated in FIG. 3) at which the entire upper surface of the reading device main body 16 which includes the reading surface 16*a* is exposed, with the hinge portion 17 as the center of rotation.

The reading surface 16*a* has a size such that it is possible to read up to an image that is the same size as the paper sheet P of a legal size that is larger than the paper sheet P of an A4 size. The legal size is a size of 8.5 inches×14 inches, and is a size at which the long side is approximately 59 mm longer and the short side is approximately 6 mm longer than A4 size (297 mm×210 mm). Then, the reading surface 16*a* is provided on the reading device main body 16 such that the long side extends in the width direction X.

An operation portion 19 for performing various operations of the composite apparatus 11 is provided in an inclined state between the upper end portion on a front surface of the recording device 12 and the front end portion of the reading device 13. A paper discharge opening 20 with a rectangular shape through which the paper sheet P that is printed on by the recording portion 14 within the recording device 12 is discharged is open in a center portion on the front surface of the recording device 12. A paper discharge tray 21 with a rectangular shape that supports the paper sheet P which is discharged from the paper discharge opening 20 is provided to be able to be pulled out along a paper discharge direction (front direction) on the lower side of the paper discharge opening 20 in the recording device 12.

An upper stage cassette mounting portion 23 on which an upper stage paper feeding cassette 22 is mounted so as to freely attach and detach is provided on a lower side of the paper discharge tray 21 on the front surface of the recording device 12. A plurality of paper sheets P are accommodated in a laminated state on the upper stage paper feeding cassette 22. A lower stage cassette mounting portion 25 on which a lower stage paper feeding cassette 24 is mounted so as to freely attach and detach is provided on a lower side of the upper stage cassette mounting portion 23 on the front surface of the recording device 12. The plurality of paper sheets P are accommodated in a laminated state on the lower stage paper feeding cassette 24.

In a case where the size of the accommodated paper sheets P is A4 size or less, as shown in FIG. 1, the upper stage paper feeding cassette 22 and the lower stage paper feeding cassette 24 are installed within the recording device 12 such that the front surfaces become one surface with the front surface of the recording device 12. In a case where the size of the accommodated paper sheets P is the legal size, the upper stage paper feeding cassette 22 and the lower stage paper feeding cassette 24 are configured to be able to lengthen the length to fit the legal size.

Figure 4:
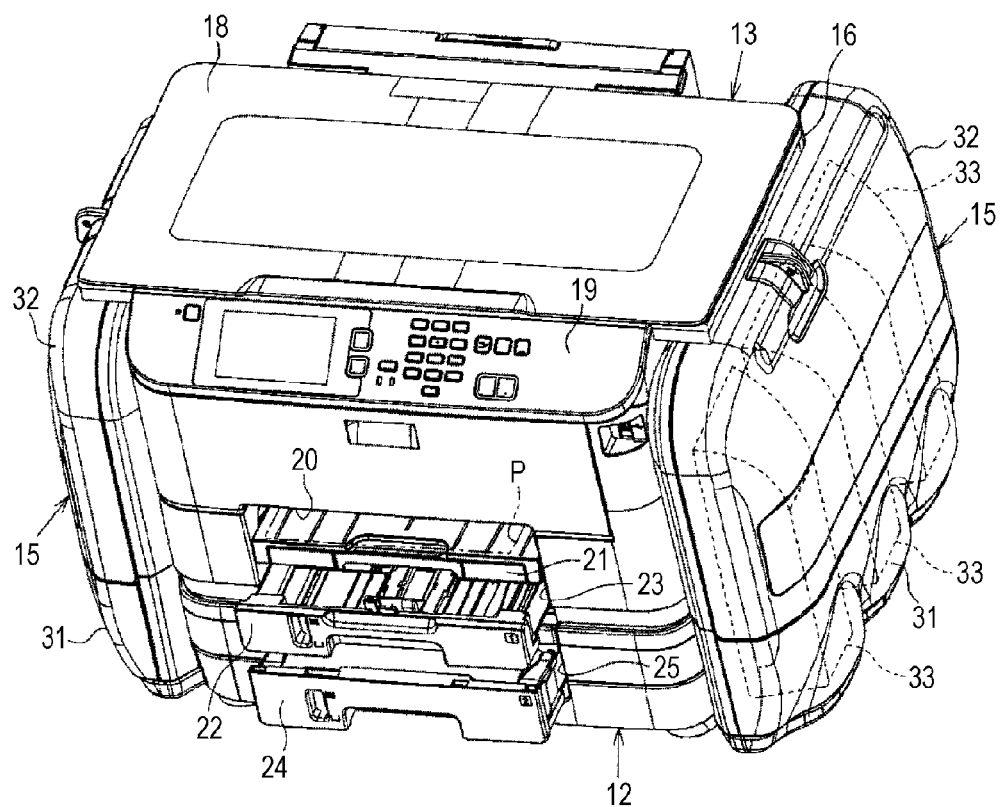
FIG. 4 is a perspective view of the composite apparatus when an upper paper feeding cassette and a lower paper feeding cassette are caused to correspond to a paper sheet of a legal size.

Then, in a case where the size of the accommodated paper sheets P is the legal size, as shown in FIG. 4, a part of the upper stage paper feeding cassette 22 and a part of the lower stage paper feeding cassette 24 protrude to the front from the front surface of the recording device 12 when respectively mounted on the upper stage cassette mounting portion 23 and the lower stage cassette mounting portion 25.

The sizes of the paper sheets P that are accommodated in the upper stage paper feeding cassette 22 and the lower stage paper feeding cassette 24 may be the same as each other or may be different from each other. That is, for example, the paper sheets P of the A4 size may be accommodated in both of the upper stage paper feeding cassette 22 and the lower stage paper feeding cassette 24, and the paper sheets P of the A4 size may be accommodated in one of the upper stage paper feeding cassette 22 and the lower stage paper feeding cassette 24 and the paper sheets P of the legal size may be accommodated in the other. Note that, the upper stage paper feeding cassette 22 and the lower stage paper feeding cassette 24 are mounted such that the paper sheets P are set in a positional state in which the depth direction Y (direction which is orthogonal to both the width direction X and the vertical direction Z) from the front surface side with respect to the recording device 12 is a long side.

As shown in FIGS. 1 and 2, the recording portion 14 that is disposed within the recording device 12 is provided with a carriage 27 that is configured to be able to reciprocally move in the width direction X (left and right direction in FIG. 2) and a liquid ejecting head 28 that is supported below the carriage 27. Then, printing is performed on the paper sheets P by ejecting ink that is supplied from the liquid accommodating portion 15 from a nozzle (illustration omitted) of the liquid ejecting head 28 that reciprocally moves in the width direction X that is a scanning direction along with the carriage 27 with respect to the paper sheets P on which the lower side of the liquid ejecting head 28 is transported from the rear side toward the front side.

As shown in FIGS. 1 and 2, each liquid accommodating portion 15 is provided with a case 31 and a lid member 32 that is provided on the case 31 and is able to open and close the case 31. The lid member 32 is provided from the center portion in the vertical direction Z outside the case 31 toward the upper end. The lid member 32 is able to rotate about an axis extending in the depth direction Y on the lower end as the center of rotation.

Then, the lid member 32 is able to rotate between a closed position (position indicated by a solid line in FIG. 2) and an open position (position indicated by a two-dot chain line in FIG. 2). In the embodiment, in a case where an angle is 0 degrees at the closed position, the lid member 32 is set such that the angle is approximately 40 degrees at the open position.

As shown in FIGS. 1 and 2, three large capacity ink packs 33 are accommodated lined up in the depth direction Y as an example of the liquid accommodating body in which color inks (liquids) which are different from each other are respectively accommodated, within the case 31 of the liquid accommodating portion 15 on one side (right side in FIG. 2) in the width direction X. Each ink pack 33 is configured by a flexible bag. Then, in the embodiment, cyan ink, magenta ink, and yellow ink are respectively accommodated in three ink packs 33. Respective color inks that are accommodated in three ink packs 33 are supplied to the respective liquid ejecting heads 28 via an ink supply tube (illustration omitted).

Meanwhile, a large capacity ink pack 34 is accommodated as an example of the liquid accommodating body in which black ink (liquid) is accommodated, within the case 31 of the liquid accommodating portion 15 on the other side (left side in FIG. 2) in the width direction X. The ink pack 34 is configured by a larger flexible bag than the bag that configures the ink packs 33. Black ink that is accommodated in the ink pack 34 is supplied to the liquid ejecting head 28 via an ink supply tube (illustration omitted).

Next, the actions of the composite apparatus 11 will be described.

First, a document is mounted on the reading surface 16*a* and the cover member 18 is closed in order to print the image of the document that is read by the reading device 13. Then, printing is performed by ejecting ink of each color from the liquid ejecting head 28 with respect to the paper sheets P that are fed from the upper stage paper feeding cassette 22 or the lower stage paper feeding cassette 24 based on image data that is read by the reading device 13. The printed paper sheets P are discharged from the paper discharge opening 20.

Here, in a case where the composite apparatus 11 is installed, in the width direction X, it is necessary to secure space of the total amount of width of two liquid accommodating portions 15 and the width of one recording device 12. Therefore, wasted empty space is generated in a region above the two liquid accommodating portions 15. In this point, in the composite apparatus 11 of the embodiment, both end portions of the reading device 13 respectively protrude from the recording device 12 to both sides in the width direction X, but are installed within the range of the width direction X of the composite apparatus 11 that includes two liquid accommodating portions 15.

That is, both end portions of the reading device 13 that protrudes from the recording device 12 in the width direction X are installed on the width of the composite apparatus 11 using a region above the two liquid accommodating portions 15. Therefore, it is possible to efficiently use the wasted empty space above the two liquid accommodating portions 15, and it is possible to increase the size of the reading device 13 in the width direction X. Furthermore, in this case, since the upper end portion of the two liquid accommodating portions 15 is a horizontal plane, it is possible to suppress interference of both end portions of the reading device 13 and the upper end portion of the two liquid accommodating portions 15.

According to the embodiment described above, it is possible to obtain the effects indicated below.

(1) In the composite apparatus 11, both end portions of the reading device 13 in the width direction X respectively protrude from the recording device 12 above the two liquid accommodating portions 15. Therefore, it is possible to efficiently use the wasted empty space above the two liquid accommodating portions 15 as a space in which both end portions of the reading device 13 in the width direction X are installed. Accordingly, in particular, in a case where the upper stage paper feeding cassette 22 and the lower stage paper feeding cassette 24 are mounted in the composite apparatus 11 such that the long sides are along the depth direction Y, it is possible to realize the reading device 13 corresponding to a greater image size or realize the reading device 13 corresponding to a specific image size upon the width of the recording device 12 reducing in the width direction X.

(2) In the composite apparatus 11, the liquid accommodating portions 15 are respectively disposed on both side portions of the recording device 12 in the width direction X. Therefore, it is possible to increase the size of the reading device 13 in the width direction X.

(3) In the composite apparatus 11, the upper end portion of each liquid accommodating portion 15 is a horizontal plane. Therefore, it is possible to suppress interference of both end portions of the reading device 13 and the upper end portion of the two liquid accommodating portions 15.

Modification Example

Note that, the above-described embodiment may be modified as below.

Figure 5:
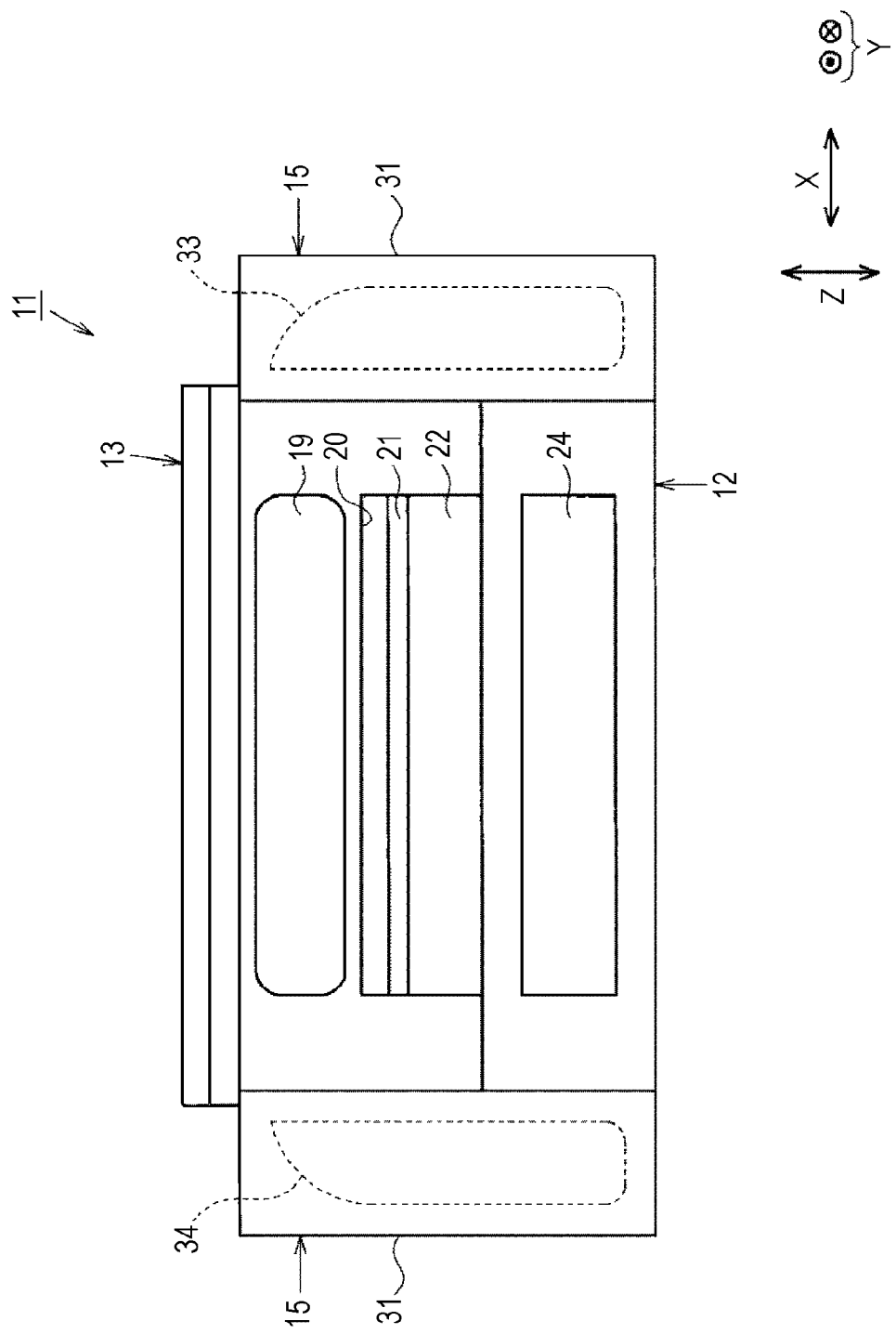
FIG. 5 is a schematic front surface view of the composite apparatus of a modification example.

As shown in FIG. 5, both end portions of the reading device 13 in the width direction X may not reach up to a region directly above the ink packs 33 and 34.

There may be a configuration in which the image (document) with a rectangular shape which has the area that is two times the size of the paper sheet P that is printed by the recording device 12 and in which the width direction X is the long side is able to be read by the reading device 13. For example, in a case where the paper sheet size up to A4 is able to be printed by the recording portion 14, the size of the image (document) that is readable by the reading device 13 may be up to A3. By doing this, as shown in FIG. 6, it is possible to space efficiently dispose the reading device 13 that is able to read the image (document) with the area that is two times the paper sheet size that is able to be printed on by the recording portion 14 by realizing the width of the width direction X using the liquid accommodating portion 15 while realizing the width in the depth direction Y by providing the operation portion 19 on the front surface of the recording device 12.

Figure 6:
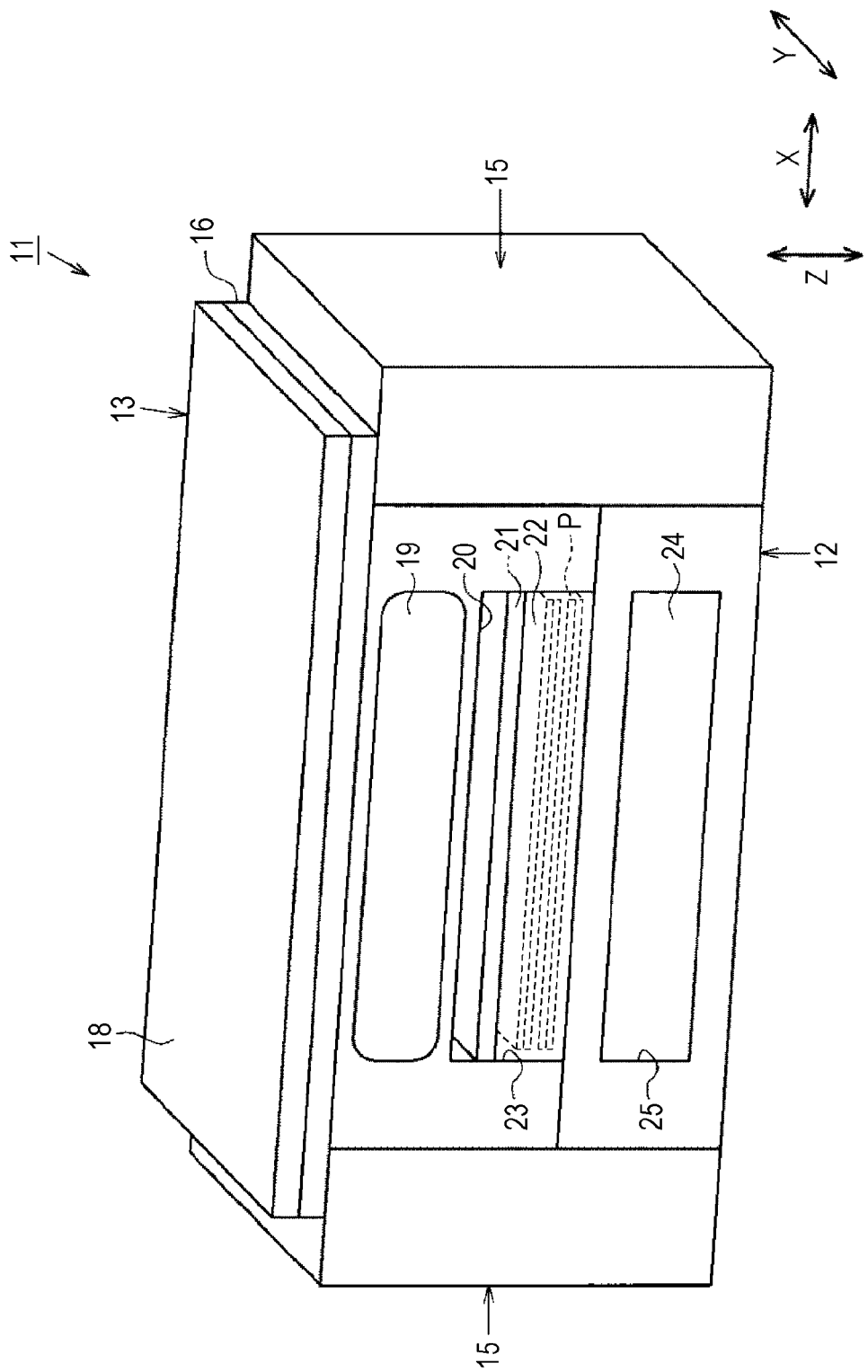
FIG. 6 is a schematic perspective view of the composite apparatus of a modification example.
Figure 7:
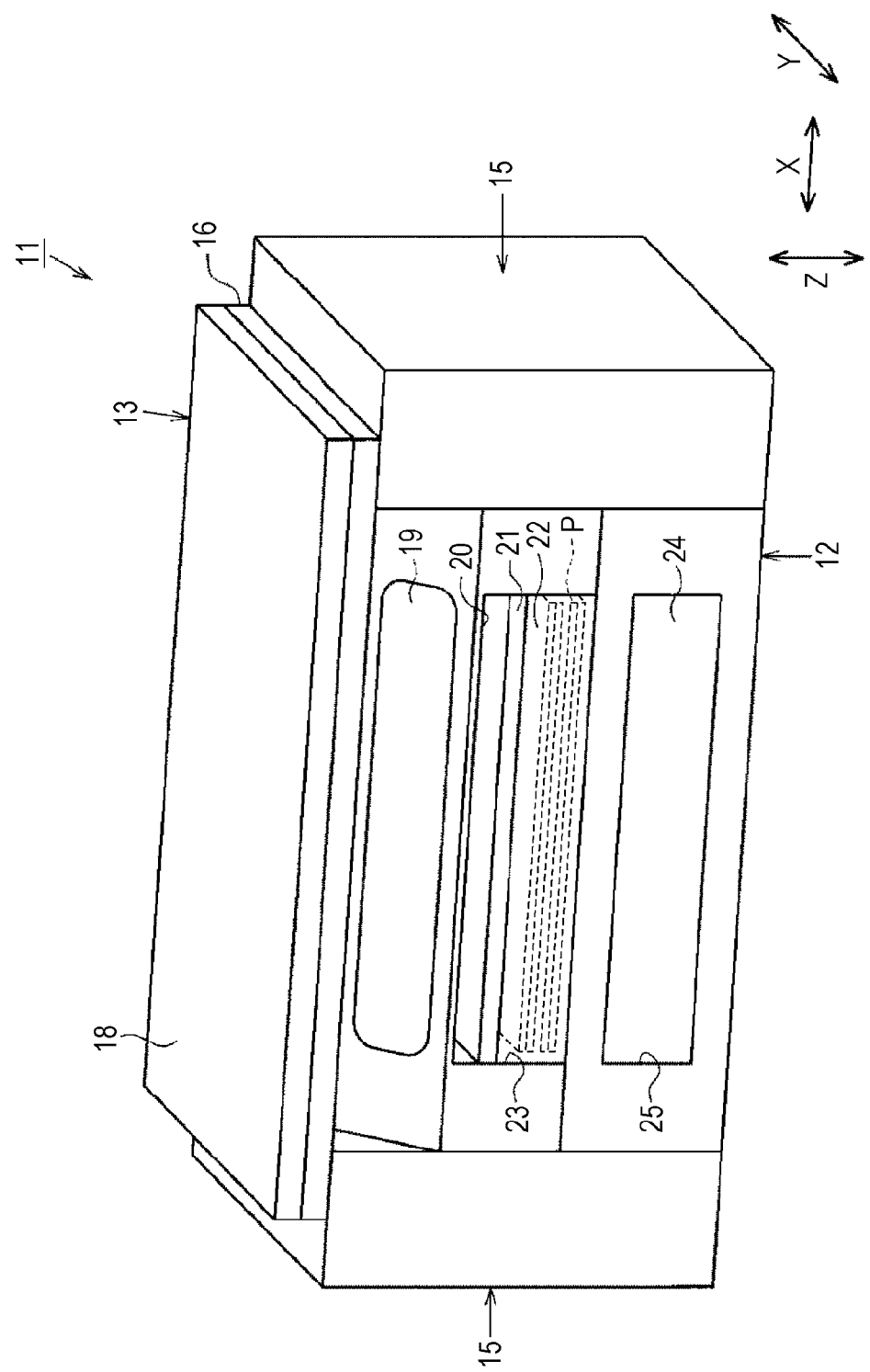
FIG. 7 is a schematic perspective view of the composite apparatus of a modification example.

As shown in FIG. 7, in the composite apparatus 11 in FIG. 6, the operation portion 19 may be inclined by inclining the upper end portion on the front surface of the recording device 12 to be depressed.

Figure 8:
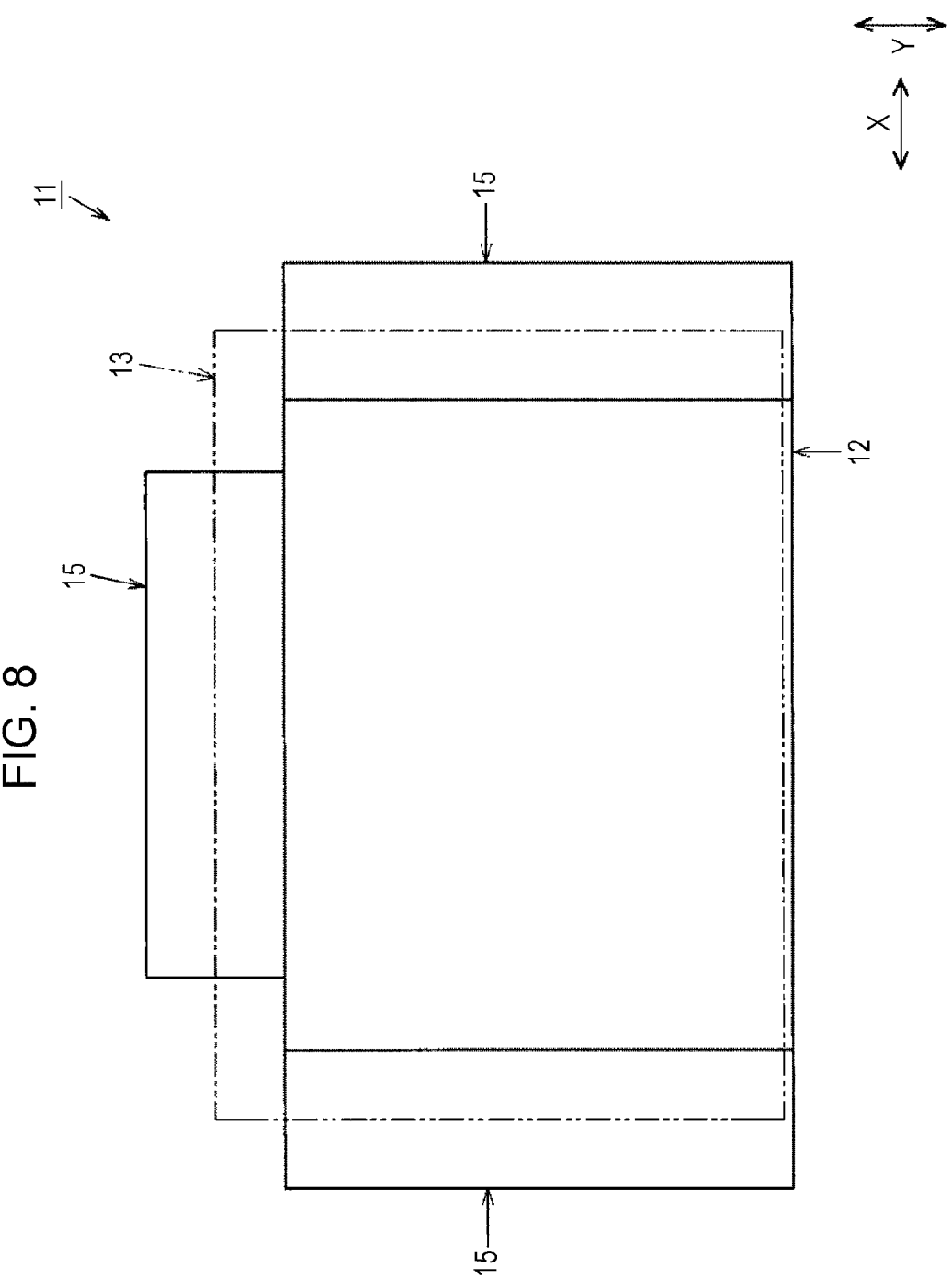
FIG. 8 is a schematic planar view of the composite apparatus of a modification example.

As shown in FIG. 8, in the composite apparatus 11, the liquid accommodating portion 15 may be disposed on not only both side portions of the recording device 12 in the width direction X, but the rear side portion of the recording device 12. By doing this, since it is possible to increase the space above the liquid accommodating portion 15 that is disposed on the rear side portion of the recording device 12 as a disposal region of the reading device 13, it is possible to increase the size of the reading device 13 in the depth direction Y of the recording device 12.

Figure 9:
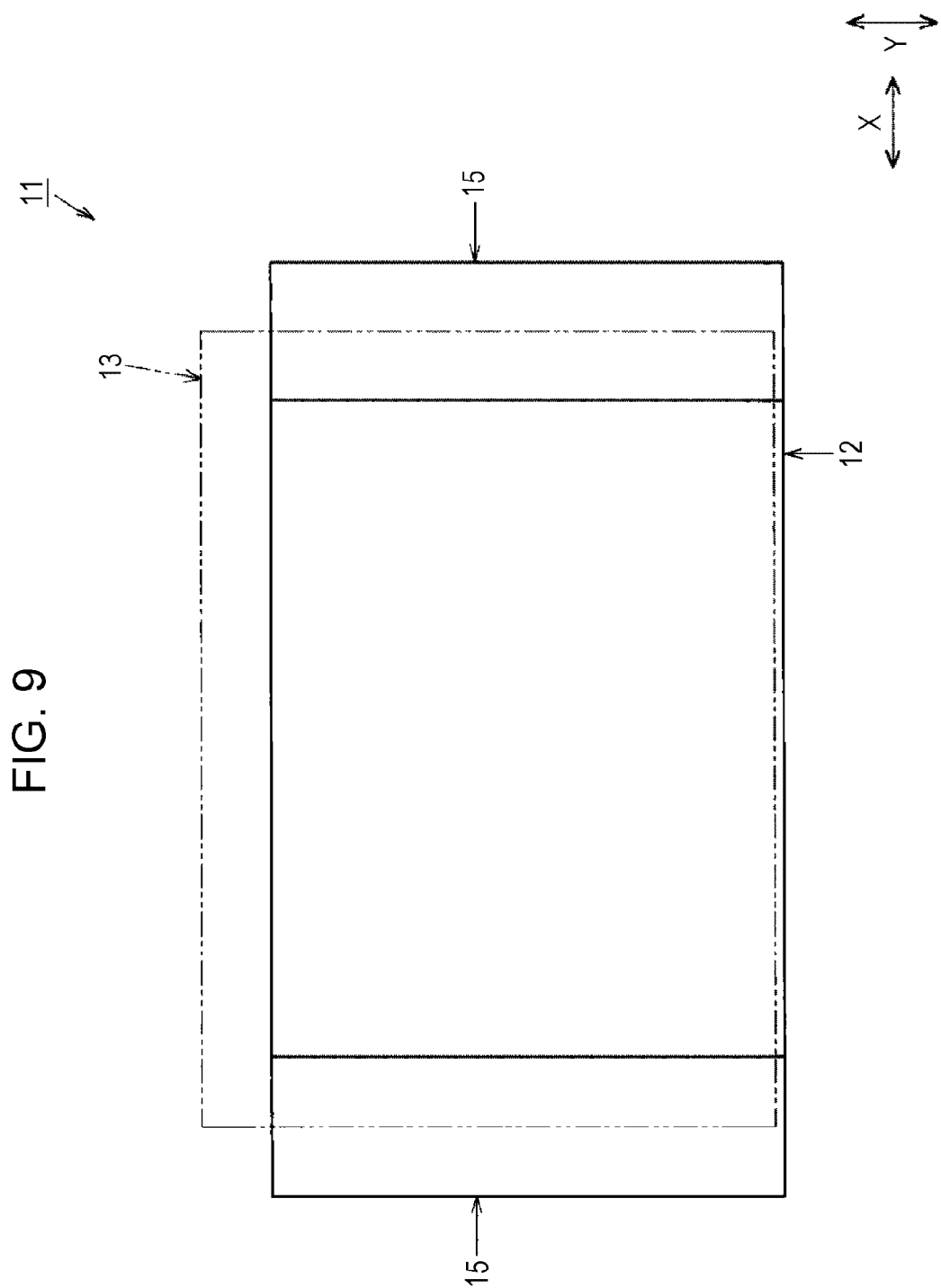
FIG. 9 is a schematic planar view of the composite apparatus of a modification example.

As shown in FIG. 9, in the composite apparatus 11 in FIG. 8, the liquid accommodating portion 15 that is disposed on the rear side portion of the recording device 12 may be omitted.

Figure 10:
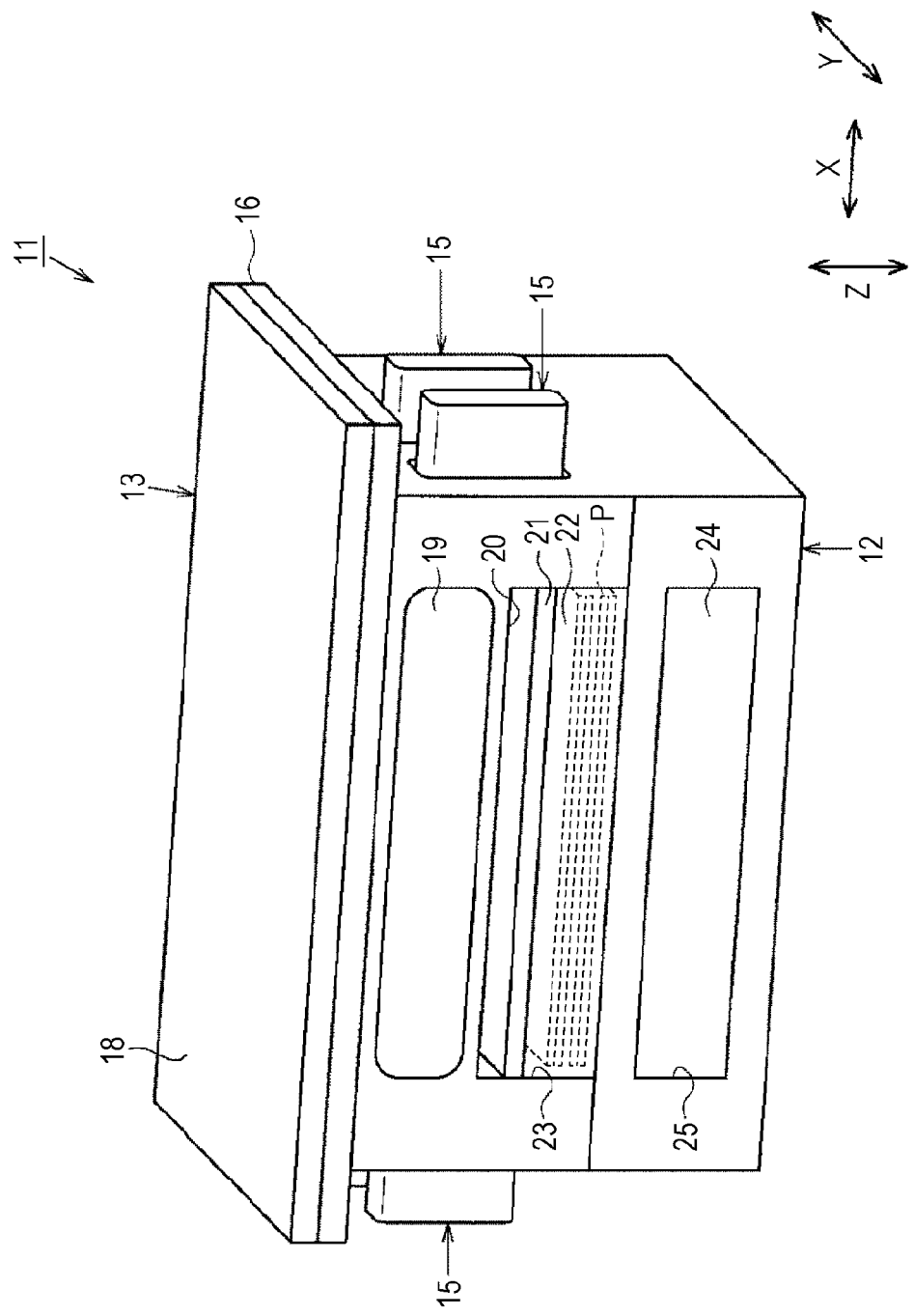
FIG. 10 is a schematic perspective view of the composite apparatus of a modification example.

As shown in FIG. 10, in the composite apparatus 11, the liquid accommodating portion 15 may be configured by a large capacity ink cartridge, and the ink cartridge may be mounted such that at least one part thereof protrudes from the recording device 12 with respect to the side surface of the recording device 12. By doing this, it is possible to efficiently use space above the protruding part from the recording device 12 in the ink cartridge as the disposal region on both end portions of the reading device 13 in the width direction X. Note that, in the width direction X, the protrusion length from the recording device 12 in the reading device 13 is the same as the protrusion length of the liquid accommodating portion 15.

Figure 11:
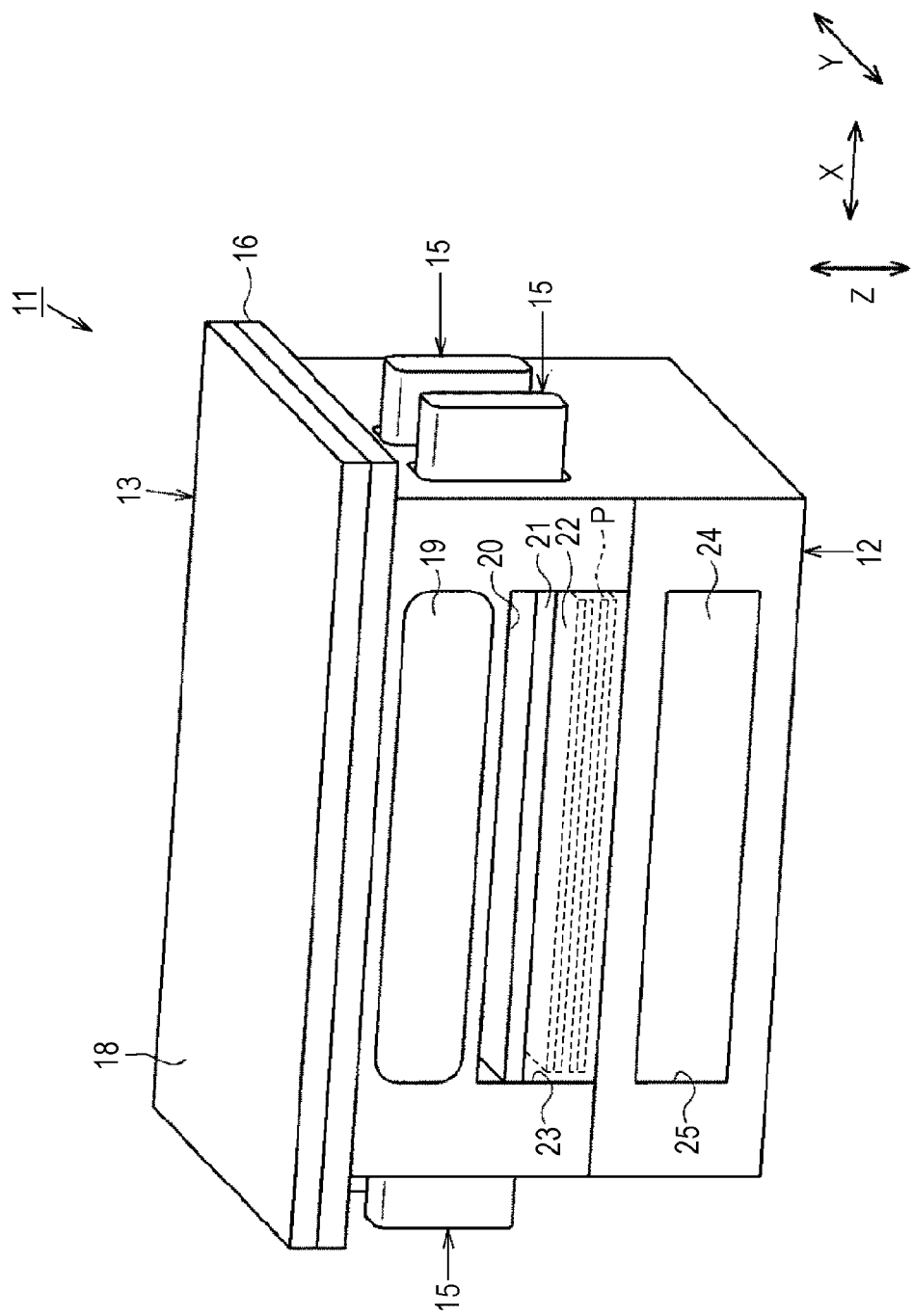
FIG. 11 is a schematic perspective view of the composite apparatus of a modification example.

As shown in FIG. 11, in the composite apparatus 11 in FIG. 10, the protrusion length from the recording device 12 in the reading device 13 may be shorter than the protrusion length of the liquid accommodating portion 15.

Figure 12:
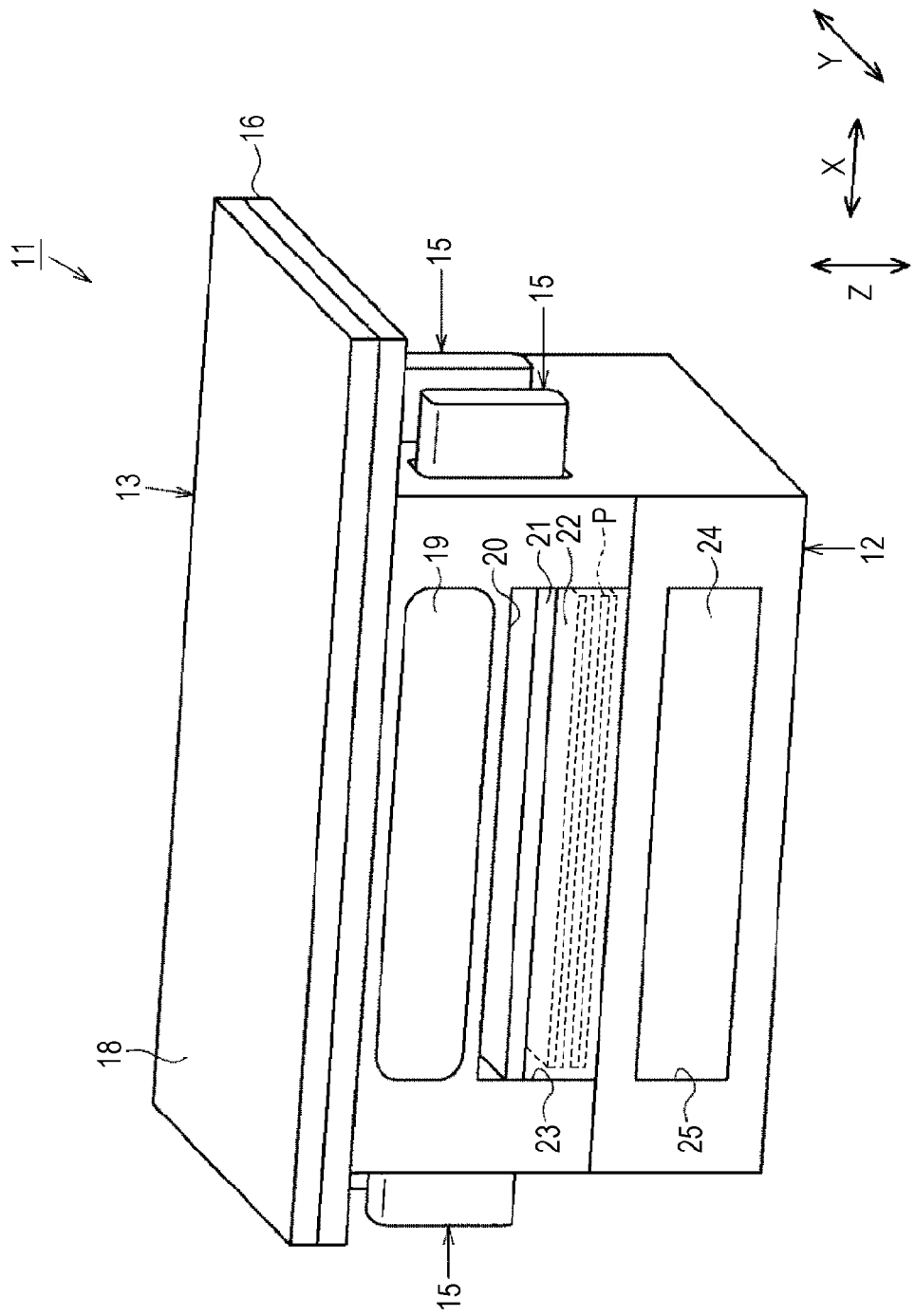
FIG. 12 is a schematic perspective view of the composite apparatus of a modification example.

As shown in FIG. 12, in the composite apparatus 11 in FIG. 10, the protrusion length from the recording device 12 in the reading device 13 may be longer than the protrusion length of the liquid accommodating portion 15.

Figure 13:
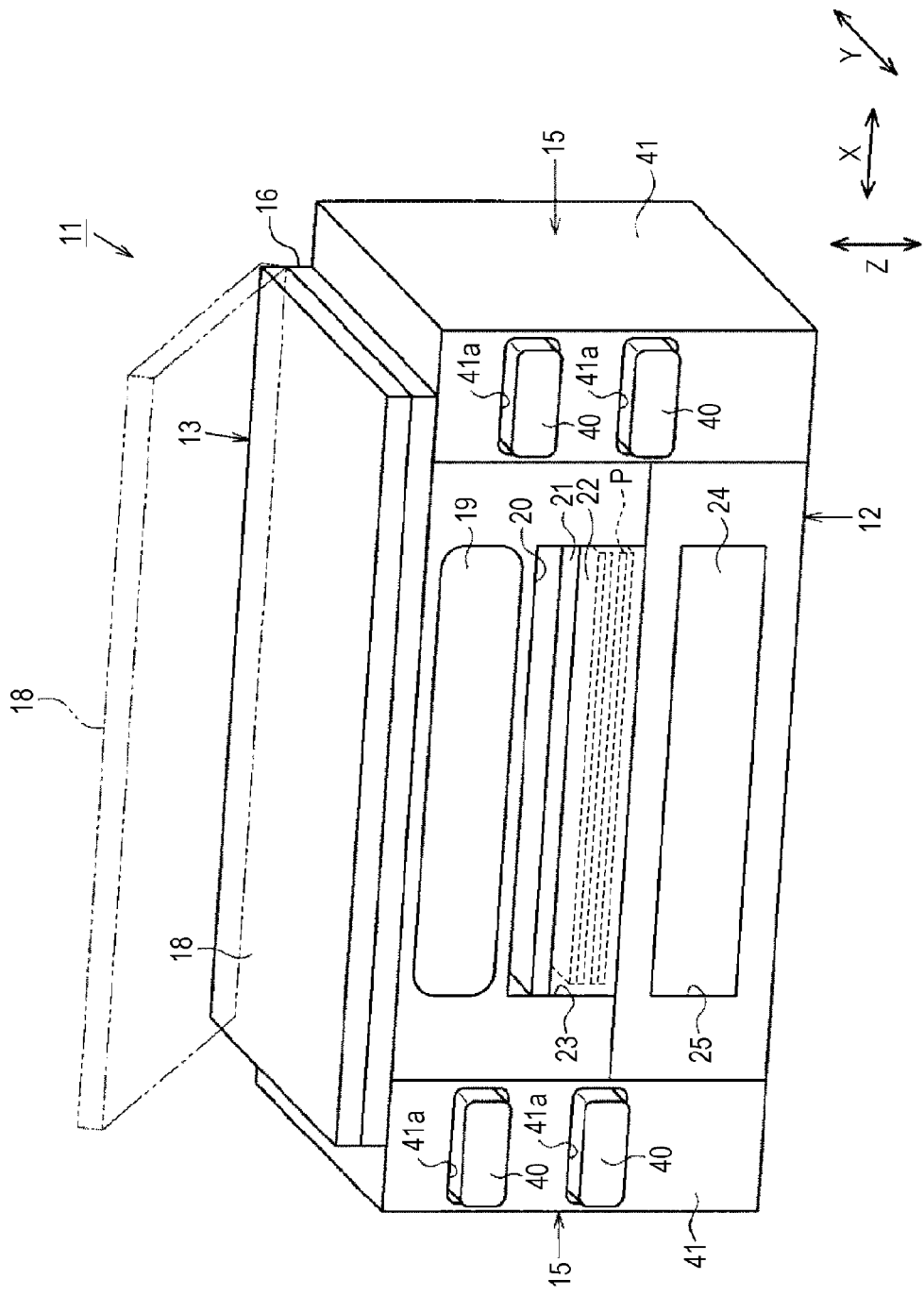
FIG. 13 is a schematic perspective view of the composite apparatus of a modification example.

As shown in FIG. 13, in the composite apparatus 11, the liquid accommodating portion 15 may be configured to be provided with an insertion case 41 that has an insertion port 41a in which it is possible to insert the large capacity ink cartridge 40 as an example of the liquid accommodating body in which ink (liquid) is accommodated, and the insertion port 41a may be disposed on the side portion of the insertion case 41 with a rectangular shape. By doing this, it is possible to suppress the reading device 13 from being an obstacle when the ink cartridge 40 is inserted in and removed from the insertion port 41*a*. Note that, the insertion port 41*a* is provided on the front surface of the insertion case 41 in FIG. 13, but the insertion port 41*a* may be provided on the side surface or the rear surface of the insertion case 41.

Figure 14:
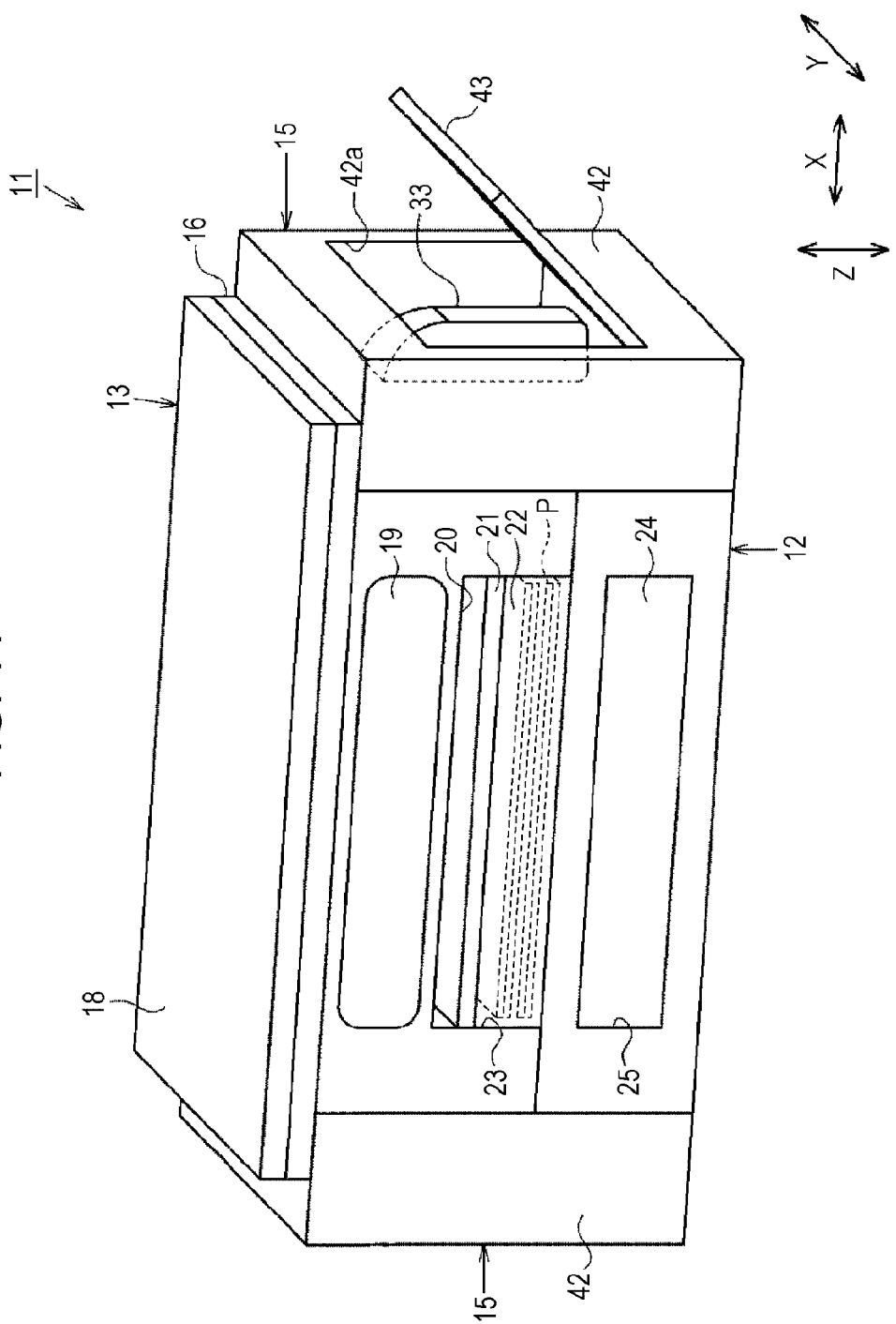
FIG. 14 is a schematic perspective view of the composite apparatus of a modification example.

As shown in FIG. 14, in the composite apparatus 11, the liquid accommodating portion 15 may be configured to be provided with an accommodating case 42 with a rectangular shape that has an opening portion 42*a* on the side portion in which it is possible to accommodate the ink pack 33 in which ink (liquid) is accommodated and a lid 43 with a rectangular shape that is able to open and close the opening portion 42*a*, and the opening and closing trajectory when the lid 43 is opened and closed may be separated from the reading device 13. In this case, the opening portion 42*a* is provided in the center portion in the vertical direction Z on the side surface of the accommodating case 42, the lid 43 opens and closes the opening portion 42*a* by rotating with the axis of rotation as the center of rotation extending in the depth direction Y on the lower end. By doing this, since the opening and closing trajectory (rotary trajectory) when the lid 43 is opened and closed is separated from the reading device 13, it is possible to suppress the reading device 13 from being an obstacle when the lid 43 is opened and closed. Note that, the lid 43 may be a sliding type that opens and closes the opening portion 42*a* by sliding in the depth direction Y, and may be a removable type that opens and closes the opening portion 42*a* by attaching and detaching with respect to the accommodating case 42.

Figure 15:
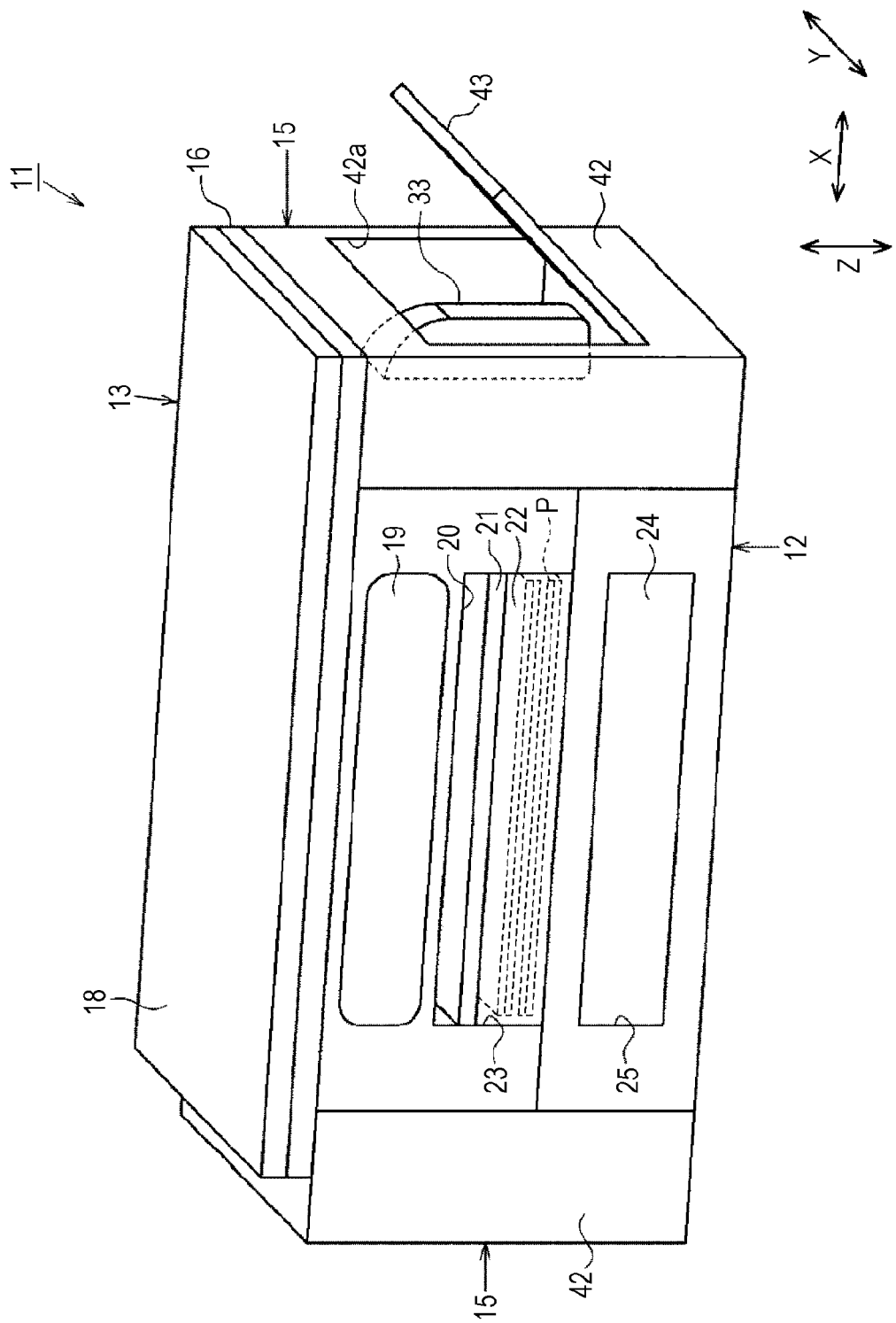
FIG. 15 is a schematic perspective view of the composite apparatus of a modification example.

As shown in FIG. 15, in the composite apparatus 11 in FIG. 14, the end surface of the reading device 13 in the width direction X and an outer surface of the liquid accommodating portion 15 in the width direction X may be the same surface.

Figure 16:
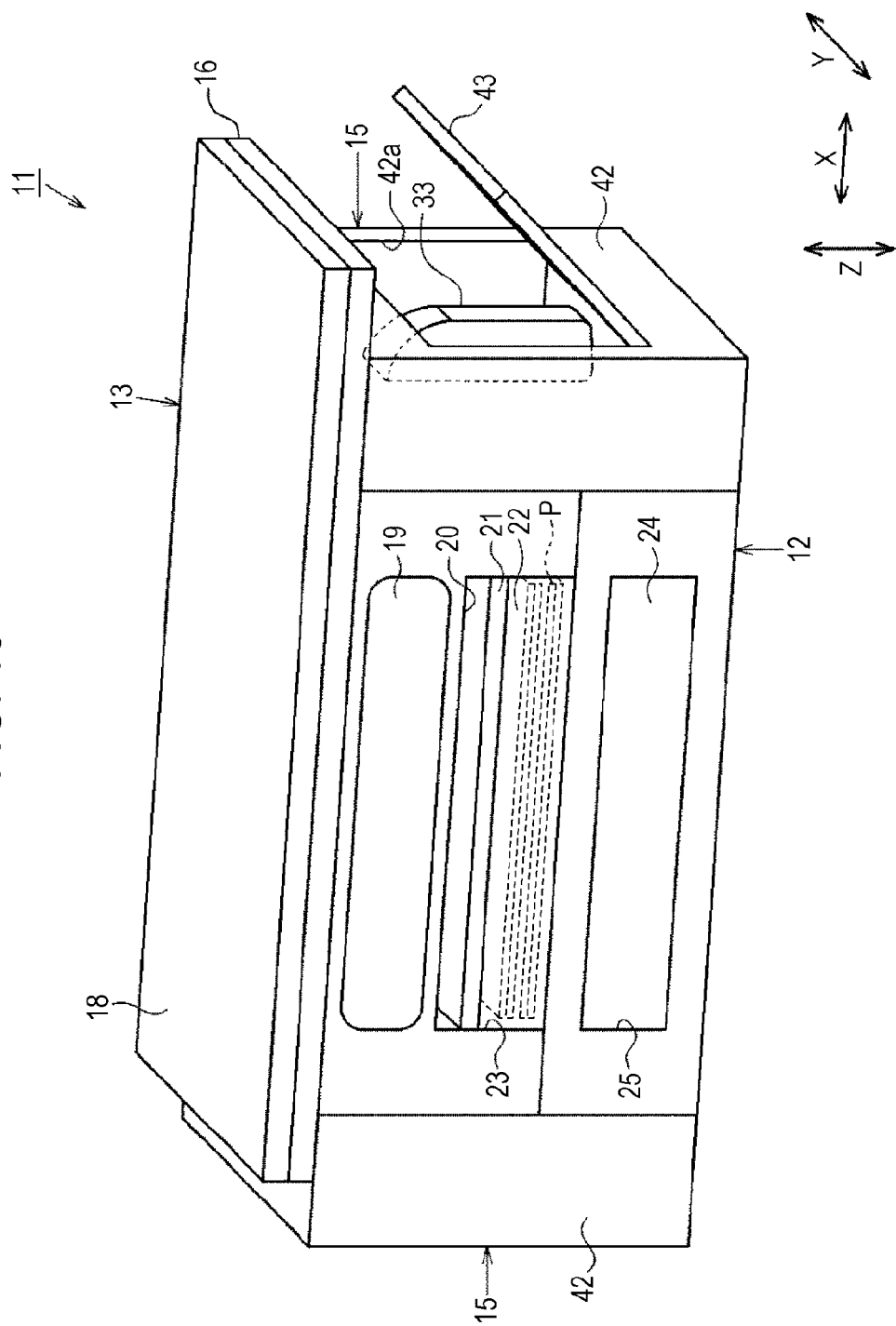
FIG. 16 is a schematic perspective view of the composite apparatus of a modification example.

As shown in FIG. 16, in the composite apparatus 11 in FIG. 14, the end portion of the reading device 13 in the width direction X may protrude further outside in the width direction X than the outer surface of the liquid accommodating portion 15 in the width direction X.

Figure 17:
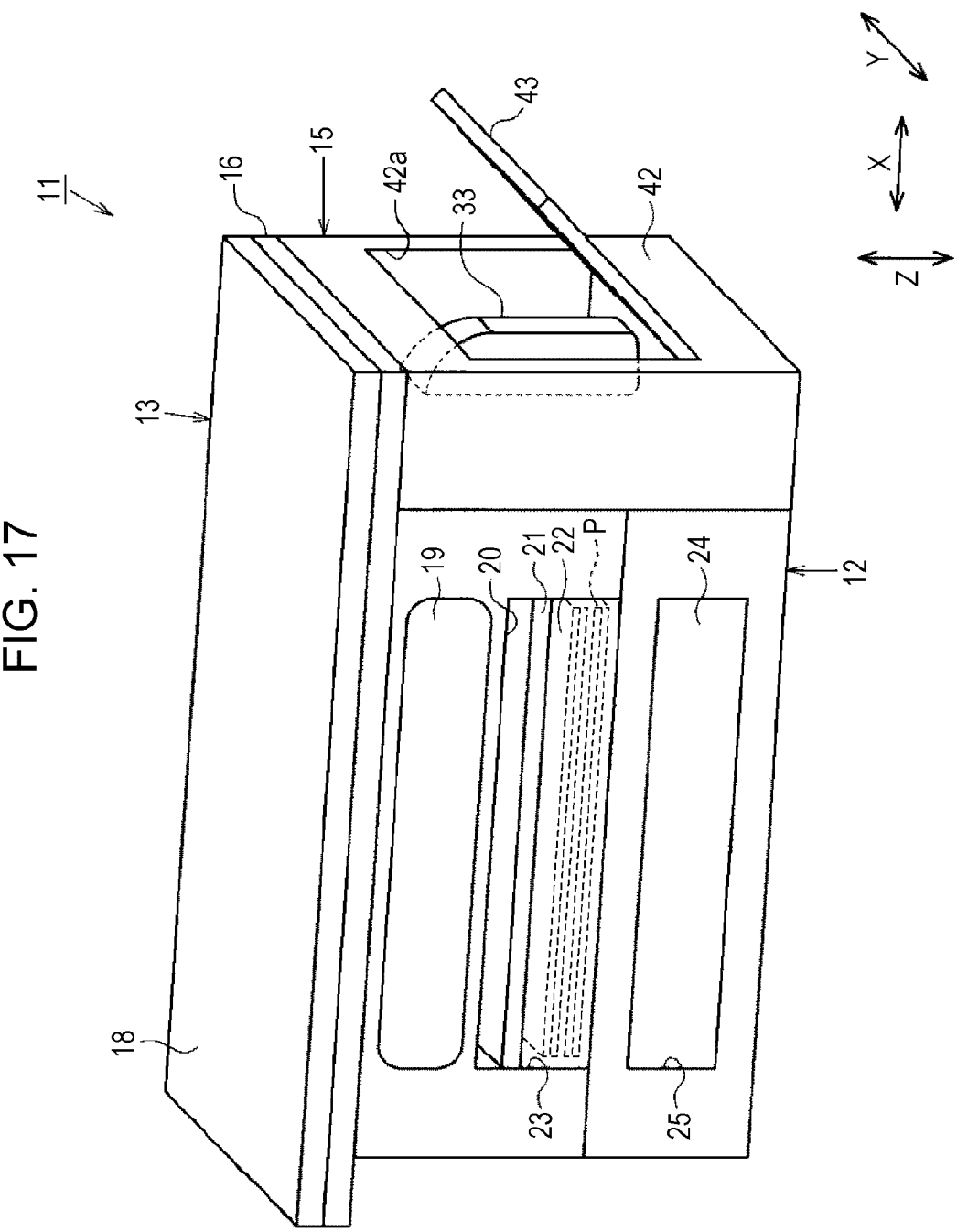
FIG. 17 is a schematic perspective view of the composite apparatus of a modification example.

As shown in FIG. 17, in the composite apparatus 11 in FIG. 15, the liquid accommodating portion 15 on the black ink side (left side in FIG. 17) may be omitted.

Figure 18:
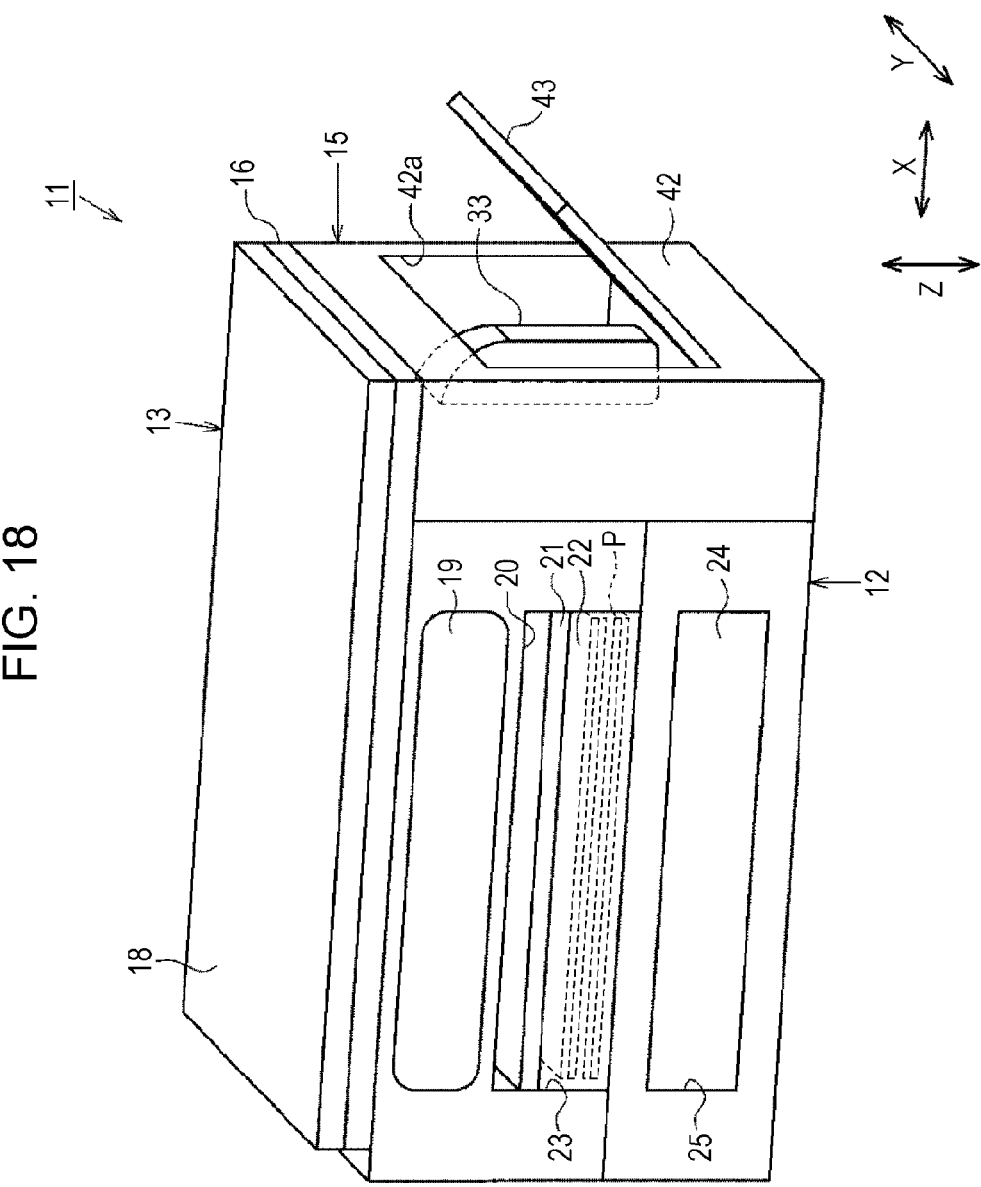
FIG. 18 is a schematic perspective view of the composite apparatus of a modification example.

As shown in FIG. 18, in the composite apparatus 11 in FIG. 17, the end portion of the reading device 13 on the opposite side to the liquid accommodating portion 15 may be disposed further inside in the width direction X than the side surface of the recording device 12 on the opposite side from the liquid accommodating portion 15.

Figure 19:
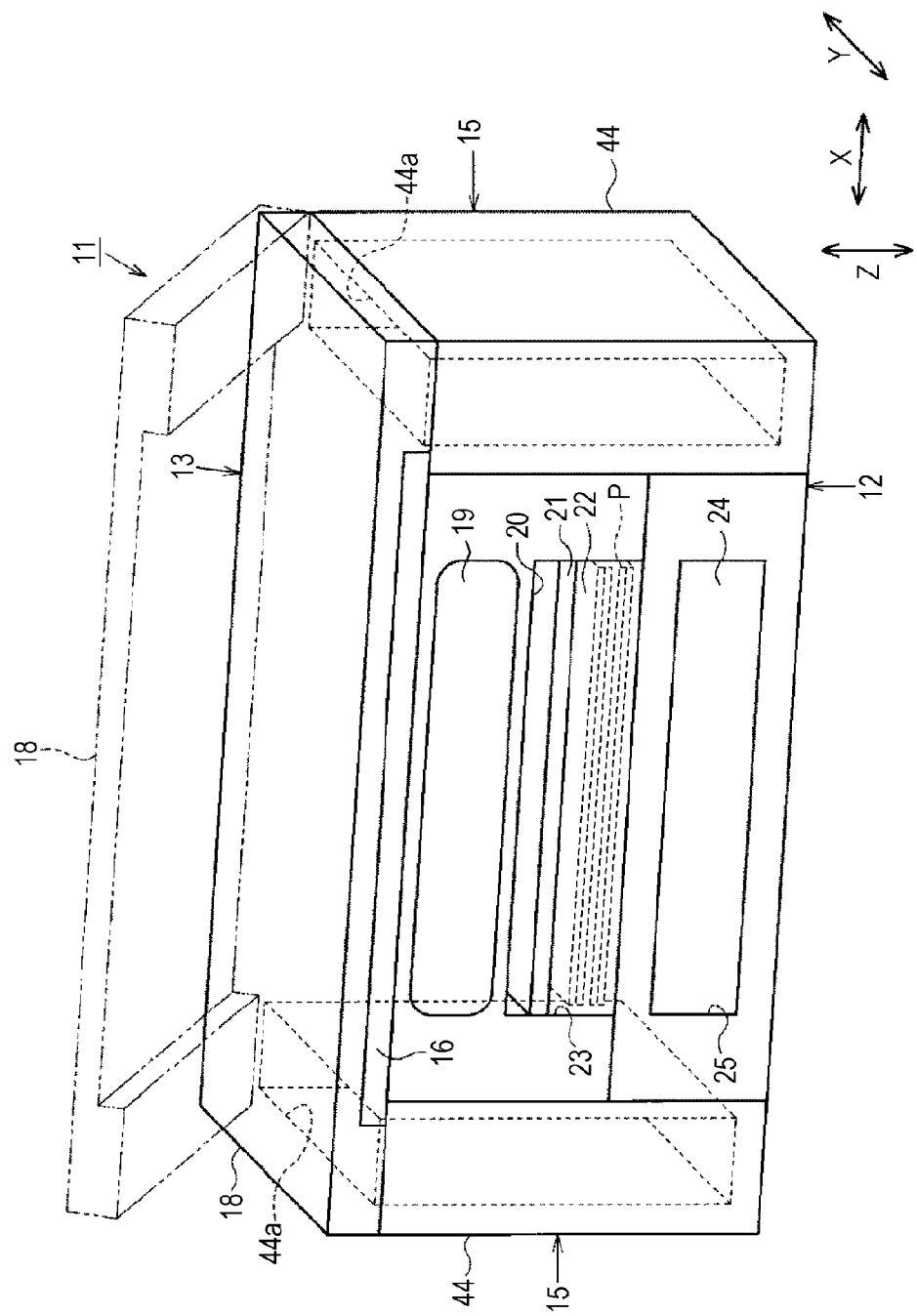
FIG. 19 is a schematic perspective view of the composite apparatus of a modification example.

As shown in FIG. 19, in the composite apparatus 11, the liquid accommodating portion 15 has an opening portion 44*a* on an upper side, and is configured to include a storage case 44 that is able to store the ink packs 33 and 34 (refer to FIG. 2). Then, the cover member 18 may close the opening portion 44*a* when at the first position (position indicated by the solid line in FIG. 19), and may open the opening portion 44*a* when at the second position (position indicated by the two-dot chain line in FIG. 19). According to the configuration, it is possible to cause the cover member 18 of the reading device 13 to function as a lid that opens and closes the opening portion 44*a* of the storage case 44.

Figure 20:
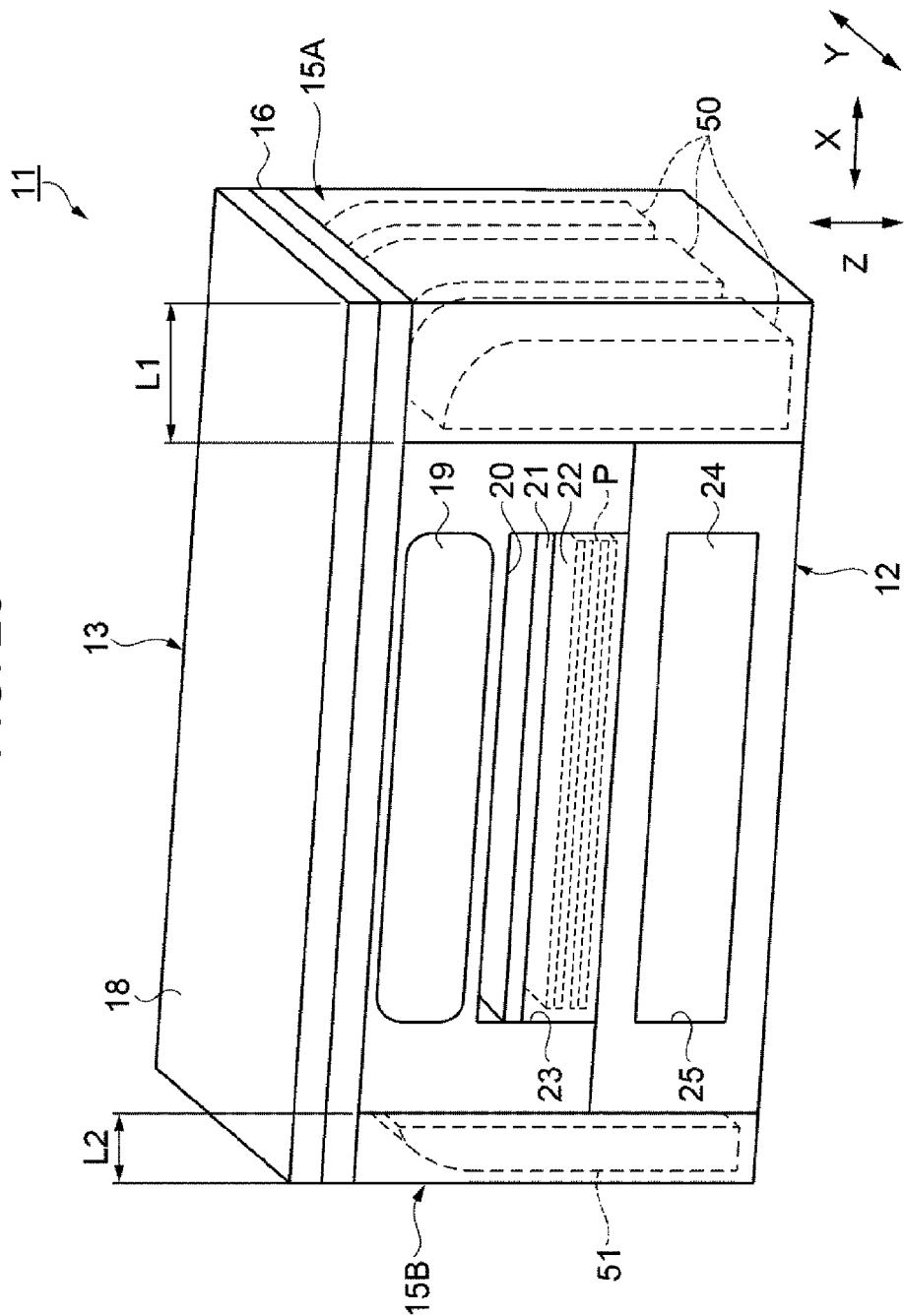
FIG. 20 is a schematic perspective view of the composite apparatus of a modification example.

As shown in FIG. 20, protrusion amounts L1 and L2 by which the reading device 13 respectively protrude above liquid accommodating portions 15A and 15B may be different. In the composite apparatus 11 in FIG. 20, the liquid accommodating portions 15A and 15B are disposed on both sides of the recording device 12 in the width direction X. In the width direction X, the profile length of the liquid accommodating portion 15A is longer than the profile length of the liquid accommodating portion 15B.

Three ink packs 50 are accommodated in the liquid accommodating portion 15A. Color inks of cyan ink, magenta ink, and yellow ink are respectively accommodated in the ink packs 50. An ink pack 51 in which black ink is accommodated in the liquid accommodating portion 15B. The ink pack 50 is longer than the ink pack 51 in the width direction X, and the ink pack 51 is longer than the ink pack 50 in the depth direction Y.

In the reading device 13, the protrusion amount L1 that protrudes from the recording device 12 above one liquid accommodating portion 15A is longer than the protrusion amount L2 that protrudes from the recording device 12 above the other liquid accommodating portion 15B. According to the configuration, it is possible to stably support the reading device 13 using the recording device 12.

Figure 21:
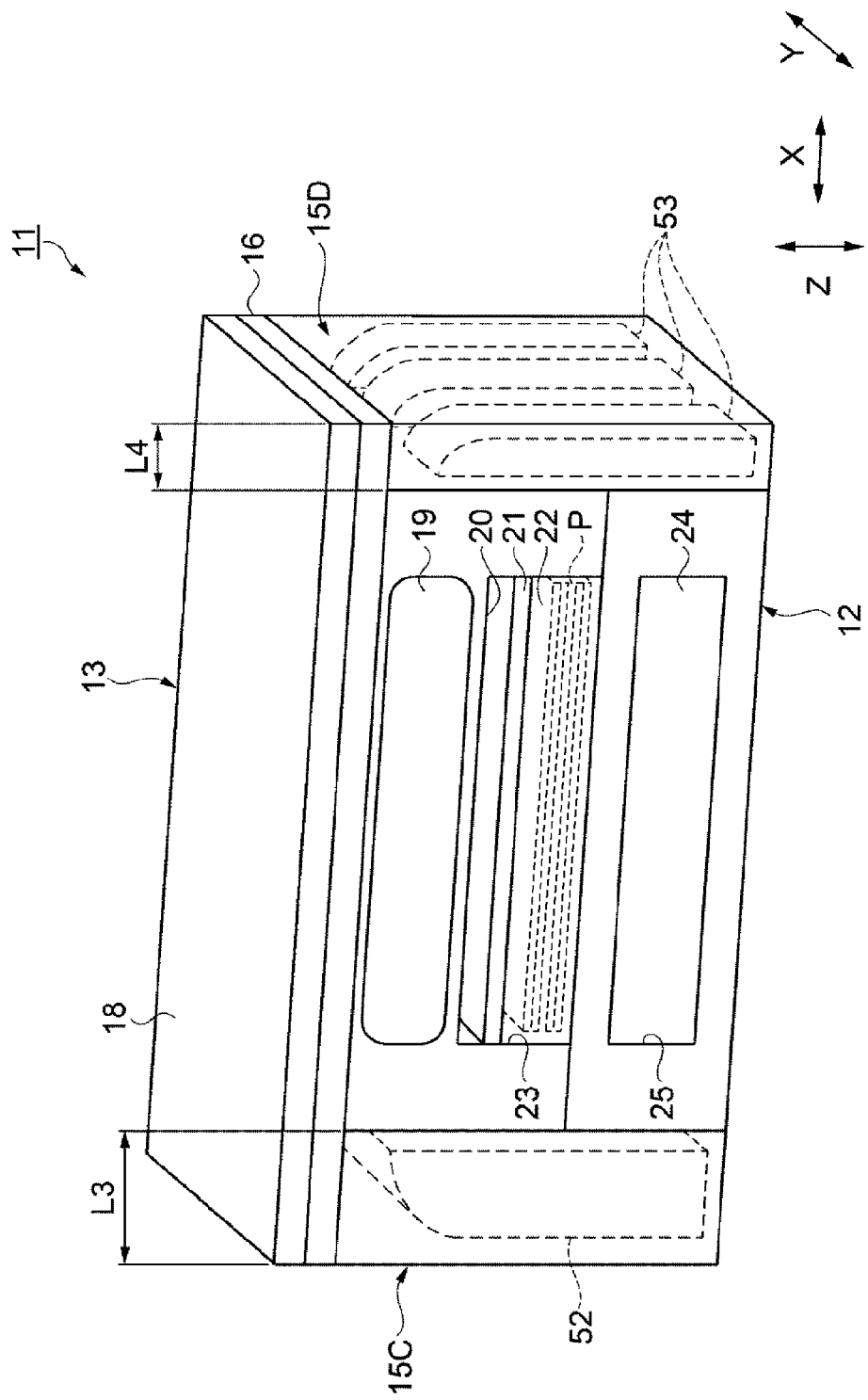
FIG. 21 is a schematic perspective view of the composite apparatus of a modification example.

The profile length of the liquid accommodating portion 15B that accommodates the ink pack 51 in which black ink is accommodated in FIG. 20 is shorter than the profile length of the liquid accommodating portion 15A that accommodates the ink pack 50 in which the color ink is accommodated in the width direction X, but as shown in the composite apparatus 11 in FIG. 21, the profile length of a liquid accommodating portion 15C that accommodates the ink pack 52 in which black ink is accommodated may be longer than the profile length of a liquid accommodating portion 15D that accommodates an ink pack 53 in which color ink is accommodated in the width direction X.

In the reading device 13, a protrusion amount L3 that protrudes from the recording device 12 above one liquid accommodating portion 15C is longer than a protrusion amount L4 that protrudes from the recording device 12 above the other liquid accommodating portion 15D. According to the configuration, it is possible to stably support the reading device 13 using the recording device 12. The positions of the end portions of the reading device 13 in the width direction X in FIGS. 20 and 21 are the same as the positions of the end portions of the liquid accommodating portions 15A, 15B, 15C, and 15D, but the positions of the end portions may be different.

In the composite apparatus 11, the size of the image (document) that is able to be read by the reading device 13 may be larger than the size of the paper sheets P that are able to be printed (recorded) by the recording portion 14. By doing this, using the reading device 13, it is possible to read the image (document) that is larger than the paper sheet P that is printable by the recording portion 14. In this case, for example, in a case where the reading device 13 corresponds to legal size and the recording portion 14 corresponds to A4 size, it is possible to print the image that is read by the reading device 13 at legal size using the recording portion 14 by shrinking to A4 size.

In the composite apparatus 11, the size of the image (document) that is able to be read by the reading device 13 may be the same as the size of the paper sheets P that are able to be printed (recorded) by the recording portion 14. For example, the composite apparatus 11 may be configured such that both the recording portion 14 and the reading device 13 correspond to A4 size, and the composite apparatus 11 may be configured such that both the recording portion 14 and the reading device 13 correspond to A3 size.

The upper end portion of the liquid accommodating portion 15 is not necessarily a horizontal plane.

An automatic document feeding portion that automatically feeds the document on the reading surface 16a of the reading device 13 may be provided on the reading device 13.

The reading device 13 may be disposed on the liquid accommodating portion 15 via a stand.

The cover member 18 may be attached to the liquid accommodating portion 15 to be able to rotate via the hinge portion 17.

The width in the width direction X of the composite apparatus 11 that includes the recording device 12 and two liquid accommodating portions 15 may be narrower than the width in the width direction X of the reading device 13.

In the recording device 12, the side surface on which the upper stage paper feeding cassette 22 or the lower stage paper feeding cassette 24 is mounted and the side surface on which the liquid accommodating portion 15 is disposed may be the same. In this case, it is preferable that the upper stage paper feeding cassette 22 or the lower stage paper feeding cassette 24 and the liquid accommodating portion 15 do not interfere.

In place of the ink packs 33 and 34, a hard case that is formed using a rigid synthetic resin and the like and in which ink that is directly accommodated may be used as the liquid accommodating body.

At least one of the two liquid accommodating portions 15 may be omitted. In this case, it is preferable to configure such that black ink, cyan ink, magenta ink, and yellow ink are led to the liquid ejecting head 28 from one liquid accommodating portion 15.

Ink of a part of black ink, cyan ink, magenta ink, and yellow ink may be supplied from an ordinary capacity ink cartridge to the liquid ejecting head 28.

At least one of the ink packs 33 and 34 may be configured to be able to refill ink.

The disposition of two liquid accommodating portions 15 may be changed. That is, the disposition of the liquid accommodating portion 15 that accommodates color ink and the liquid accommodating portion 15 that accommodates black ink may be changed.

The composite apparatus 11 is configured corresponding to four colors of black ink, cyan ink, magenta ink, and yellow ink, but may be configured corresponding to one color or two colors, and may be configured to correspond to five or more colors.

The recording medium may not be the paper sheet P, and may be cloth, plastic film, or the like.

In the embodiment, the composite apparatus 11 may be a fluid ejecting apparatus which performs recording by ejecting or discharging a fluid other than ink (including a liquid, a liquid form body in which a particulate functional material is dispersed or mixed in a liquid, a fluid form body such as gel, and a solid body which is able to be ejected by flowing as a fluid). For example, the apparatus may be a liquid form body ejecting apparatus which performs recording by ejecting a liquid form body including, in a dispersed or dissolved form, material such as an electrode material or color material (pixel material) which are used in manufacture and the like of a liquid crystal display, an electro-luminescence (EL) display, and a surface light emission display. In addition, the liquid form body ejecting apparatus may eject the fluid form body such as gel (for example, physical gel). Then, it is possible to apply the invention to the fluid ejecting apparatus of at least one of the types. Note that, in the specification "fluid" is a concept which does not include a fluid which comprises only gas, and for example, liquid (including an inorganic solvent, an organic solvent, a solution, a liquid resin, a liquid metal (molten metal), and the like), a liquid form body, a fluid form body, and the like are included in the fluid.

Embodiment 2

Figure 22:
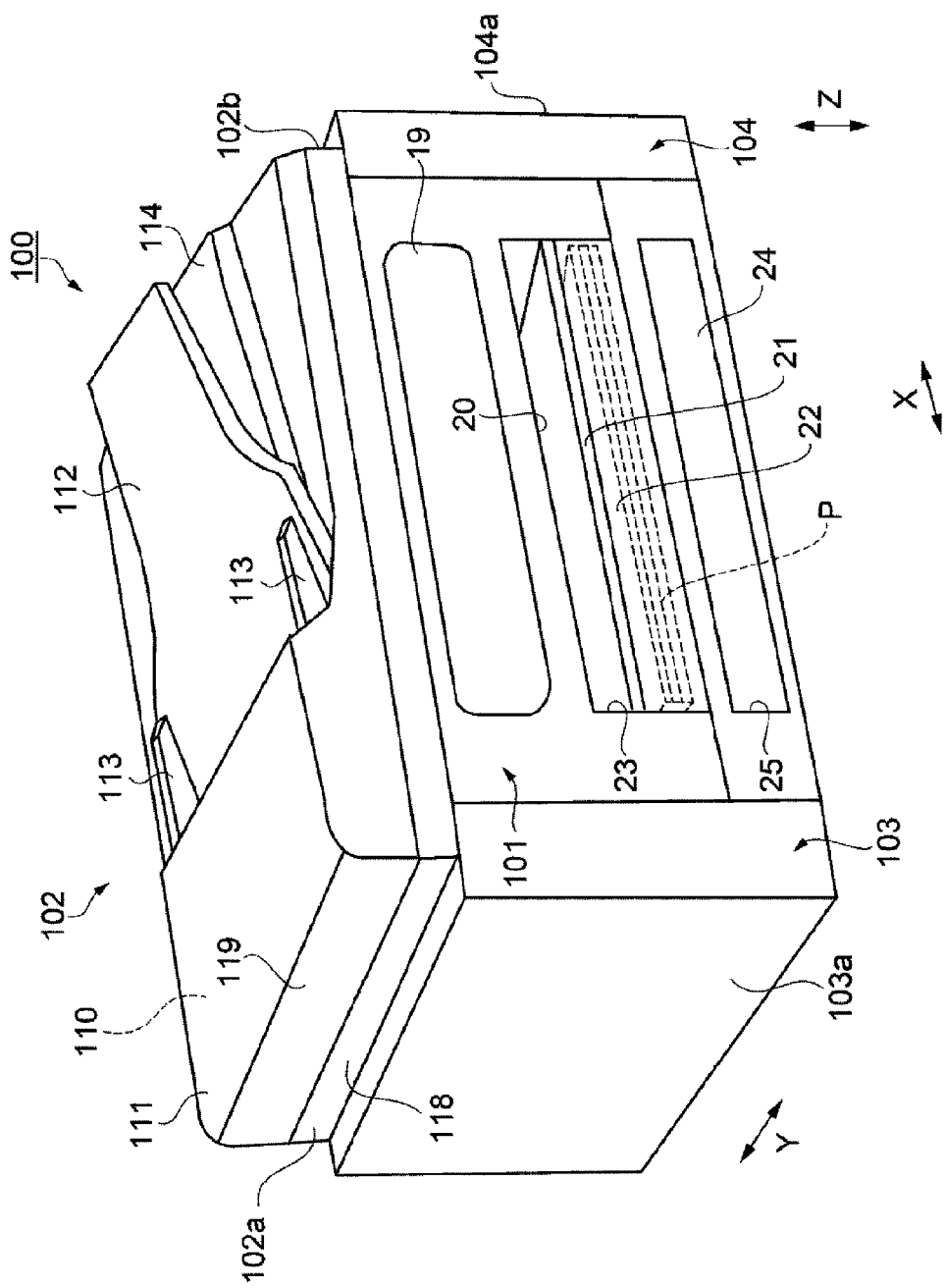
FIG. 22 is an outer appearance perspective view of a composite apparatus in Embodiment 2.

FIG. 22 is an outer appearance perspective view of a composite apparatus 100 in Embodiment 2. The composite apparatus 100 is provided with a recording device 101 that accommodates a recording portion (illustration omitted) that performs printing by ejecting ink on the paper sheet and a reading device 102 that is disposed on the recording device 101 and reads an image. Furthermore, the composite apparatus 100 is provided with liquid accommodating portions 103 and 104 which are disposed on both side portions of the recording device 101 in the width direction X and accommodate ink for to be supplied to the recording portion via an ink supply tube (illustration omitted).

The operation portion 19 for performing various operations of the composite apparatus 100, the rectangular-shaped paper discharge opening 20 that discharges the printed paper sheet, and the rectangular-shaped paper discharge tray 21 that supports the paper sheet that is discharged from the paper discharge opening 20 in a pulled state are provided in the recording device 101. In addition, the upper stage paper feeding cassette 22 and the lower stage paper feeding cassette 24 are provided so as to freely attach and detach with respect to the recording device 101.

The composite apparatus 100 is provided with functions of recording, image reading, and copying. Copying is performed by the recording device 101 recording an image on the paper sheet based on image data of the document (not illustrated) as the medium that is read by the reading device 102.

A transport portion 110 (refer to FIG. 24) is provided inside a transport portion cover 111. A plurality of documents are mounted in a feeding tray 112. The feeding tray 112 is provided at a position to which it is possible to feed the plurality of mounted documents to the transport portion 110. A pair of edge guides 113 that are displaceable in the width direction (depth direction Y) of the document are provided in the feeding tray 112, and the edge guides 113 guide both sides of the set document.

The transport portion 110 performs transport which includes paper feeding in which the document on the feeding tray 112 is fed up to a reading position one sheet at a time and discharge in which the document after the image is read is fed out. The documents on which the image is read are sequentially discharged from the transport portion 110 and are mounted on a discharge tray 114.

The liquid accommodating portions 103 and 104 are disposed on the side portion of the recording device 101 in the width direction X. End portions 102a and 102b of the reading device 102 in the width direction X are respectively positioned on the liquid accommodating portions 103 and 104. That is, the reading device 102 is provided to protrude from the recording device 101 in the width direction X on the liquid accommodating portions 103 and 104.

Figure 23:
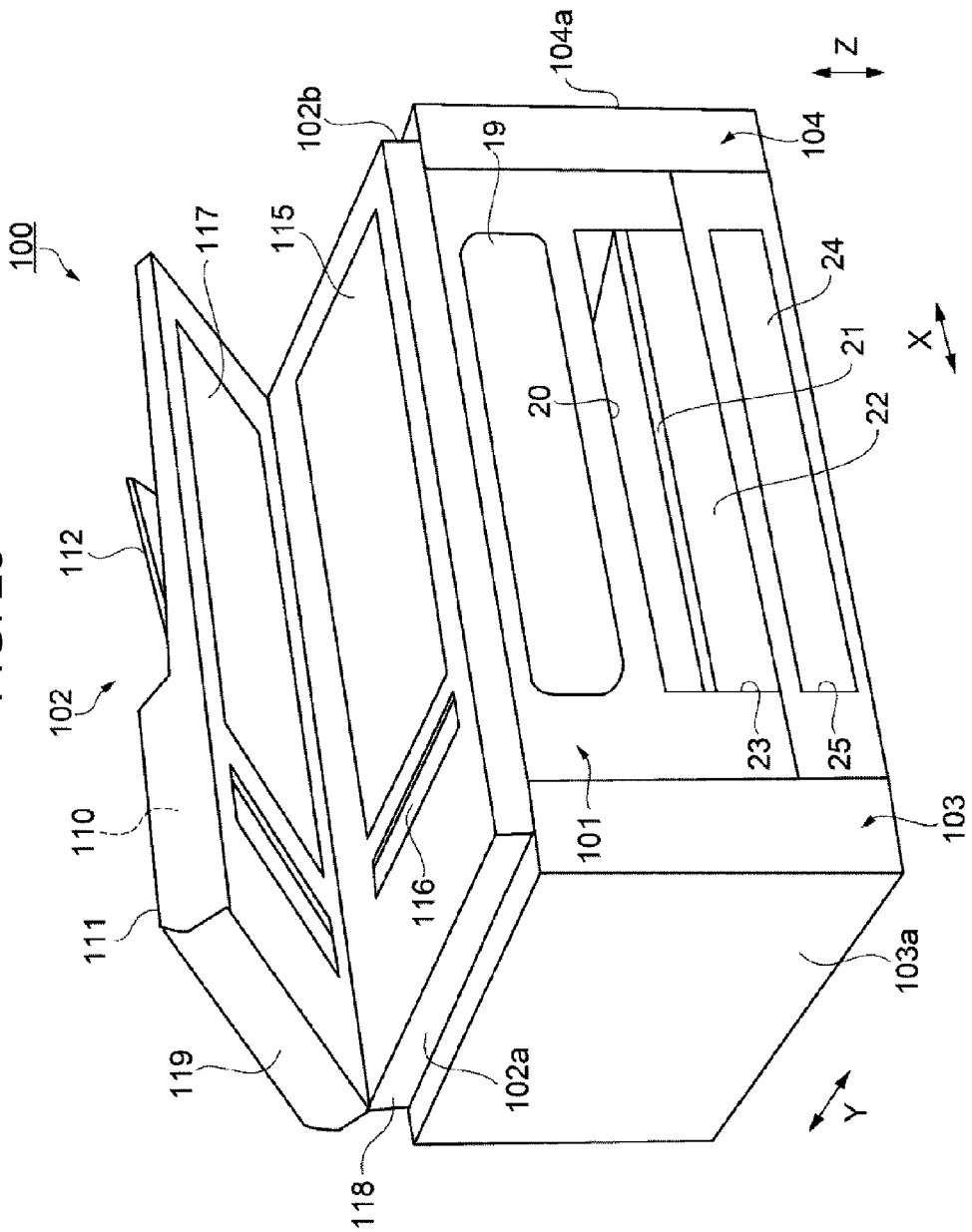
FIG. 23 is an outer appearance perspective view of the composite apparatus in Embodiment 2.

FIG. 23 is an outer appearance perspective view of the composite apparatus 100 in a state in which a rotating portion 119 rotates and is open with respect to the fixing portion 118. The rotating portion 119 is connected to be rotatable with respect to the fixing portion 118 via a hinge that is not illustrated in a state in which the feeding tray 112, the transport portion 110, and the discharge tray 114 are provided.

Document stands 115 and 116 are provided on an upper surface of the fixing portion 118. The document stand 115 is configured by a transparent member such as glass, and a document is mounted in a case where reading is performed without using the transport portion 110. In addition, the document stand 116 supports the document that is transported to the reading position by the transport portion 110.

A document mat 117 is provided on the lower portion of the rotating portion 119, and when the rotating portion 119 is closed, the document (not illustrated) that is mounted on the document stand 115 is pressed by the document mat 117 and the reading surface of the document is adhered to the document stand 115.

Figure 24:
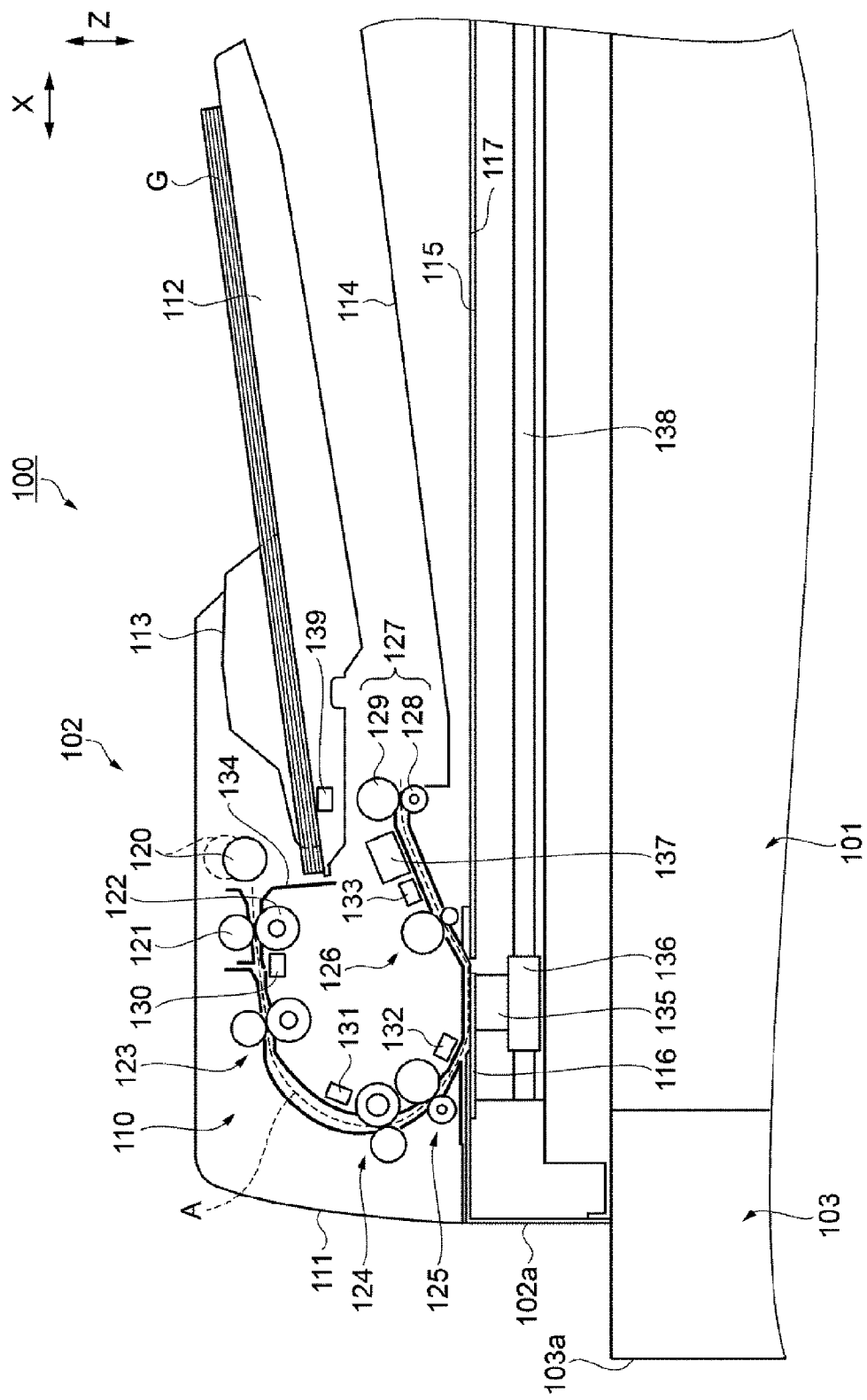
FIG. 24 is a side surface view illustrating an outline configuration of a reading device.

FIG. 24 is a side surface view illustrating an outline configuration of the reading device 102 viewed from the depth direction Y. The reading device 102 is a flatbed scanner, and a reading portion 135 that is movable with respect to the document stands 115 and 116 is provided on the lower side of the document stands 115 and 116.

The reading portion 135 as document reading means is configured as an optical system unit that radiates light toward the document stands 115 and 116, receives the reflected light and reads information of a document G, and is configured as an optical system unit, of for example, a charge coupled devices (CCD) method or a contact image sensor (CIS) method.

The reading portion 135 extends in the depth direction Y, and is provided in a carriage 136 that is movable in the width direction X. The carriage 136 moves in the width direction X by receiving motive force of a motor that is not illustrated while being guided by a guide member 138 that extends in the width direction X.

Note that, in a case where the document that is mounted on the document stand 115 is read, the reading portion 135 performs reading while moving in a sub-scanning direction. Meanwhile, in a case where the document that is transported by the transport portion 110 is read, the reading portion 135 stops on the lower side of the document stand 116 and the stop state is maintained.

A transport path of the document G in the transport portion 110 is described. A broken line A indicates the transport path of the document G that is transported within the transport portion 110. The feeding tray 112 in which it is possible to set a plurality of sheets of documents G is able to switch between a posture (raised posture) at which the top document G abuts with a feeding roller 120 and a posture (lowered posture) retreated from the feeding roller 120 using a raising and lowering mechanism that is configured by a linking mechanism and a motor that are not illustrated.

A regulating surface 134 regulates a tip end position of the document G that is set in the feeding tray 112. The feeding roller 120 that is provided above the tip end (feed out direction tip end) of the feeding tray 112 is driven by a motor for which illustration is omitted. The outer peripheral surface of the feeding roller 120 is formed using a high friction material (rubber).

The feeding roller 120 is provided to be displaceable in an up and down direction, when the feeding tray 112 is at the lowered posture, the feeding roller 120 that is indicated by a solid line is at a lowered position, and when the feeding tray 112 is raised, the feeding roller 120 that is indicated by a broken line is pressed up by the document G. Then, the top document G is fed inside the transport portion 110 due to the feeding roller 120 being rotatably driven in a state where both the feeding tray 112 and the feeding roller 120 are raised.

A separation roller 121 that is driven in a forward direction using the motor for which illustration is omitted and a retard roller 122 that nips the document G with the separation roller 121 are oppositely disposed on a downstream side in the feeding direction of the feeding roller 120. The outer peripheral surfaces of the separation roller 121 and the retard roller 122 are formed using a high friction material (for example, rubber).

The retard roller 122 is provided to be able to rotate by being driven by a predetermined rotational resistance applied thereto. Then, the top document G that is fed by the feeding roller 120 is transported in a state of being nipped by the separation roller 121 and the retard roller 122, and thus multifeeding of the next or subsequent document G is prevented.

Pairs of transport rollers 123, 124, 125, and 126 are provided in the transport path further on the downstream side than the separation roller 121 and the retard roller 122, and the document G is transported on the transport path using the plurality of pairs of transport rollers. The transport path from the pair of transport rollers 123 toward the pair of transport rollers 125 is a curve reverse path that reverses the curve of the document G.

A pair of discharge rollers 127 is provided on the downstream side of the pair of transport rollers 126. The document G that is read at the position of the document stand 116 is discharged toward the discharge tray 114 using the pair of discharge rollers 127. In the pairs of transport rollers 123 to 126 and the pair of discharge rollers 127, one roller drives so as to rotate using a motor that is not illustrated, and the other roller drivably rotates.

The document G reaches the upper surface of the document stand 116 between the pair of transport rollers 125 and the pair of transport rollers 126. At this position, the reading portion 135 is stopped, and scanning is performed by the reading portion 135 using a transport operation of the document G.

The reading portion 137 that is able to read a surface (rear surface) on an opposite side from the reading surface (front surface) of the document G by the reading portion 135 in the middle of the transport path is disposed between the pair of transport rollers 126 and the pair of discharge rollers 127. Therefore, when the reading device 102 uses the transport portion 110, it is possible to read both surfaces of the document G. Note that, the reading portion 137 may not be provided.

A document sensor 139 is a contact sensor for sensing presence or absence of the document G on the feeding tray 112. Document sensors 130, 131, 132, and 133 are document sensors for detecting that the document G passes through. It is possible to configure the document sensors 130 to 133 with a contact sensor or an optical sensor. A control portion (not illustrated) of the reading device 102 is able to perform transport control of the document G using the document sensors 130 to 133.

The pair of discharge rollers 127 is configured by a discharge driving roller 129 and a discharge driven roller 128. The documents G that are sequentially discharged by the pair of discharge rollers 127 are mounted to be stacked in the discharge tray 114.

The transport portion 110 is configured to include the feeding roller 120, the separation roller 121, the retard roller 122, pairs of transport rollers 123 to 126, the pair of discharge rollers 127, the document sensors 130 to 133, and the like.

The transport portion 110 is provided at a position overlapping the recording device 101 in the width direction X. That is, the transport portion 110 is positioned on the recording device 101. Thereby, it is possible to provide a transport portion 110 with a large weight proportion that occupies the reading device 102 with a stable posture.

In the embodiment, the region in which the document stand 116 is provided in the width direction X is provided at a position overlapping with the recording device 101. That is, the region in which the document stand 116 is provided is positioned on the recording device 101.

Thereby, since it is possible to suppress a change of shape of the document stand 116, it is possible to suppress a reduction of image quality that is read by the reading portion 135.

Figure 25:
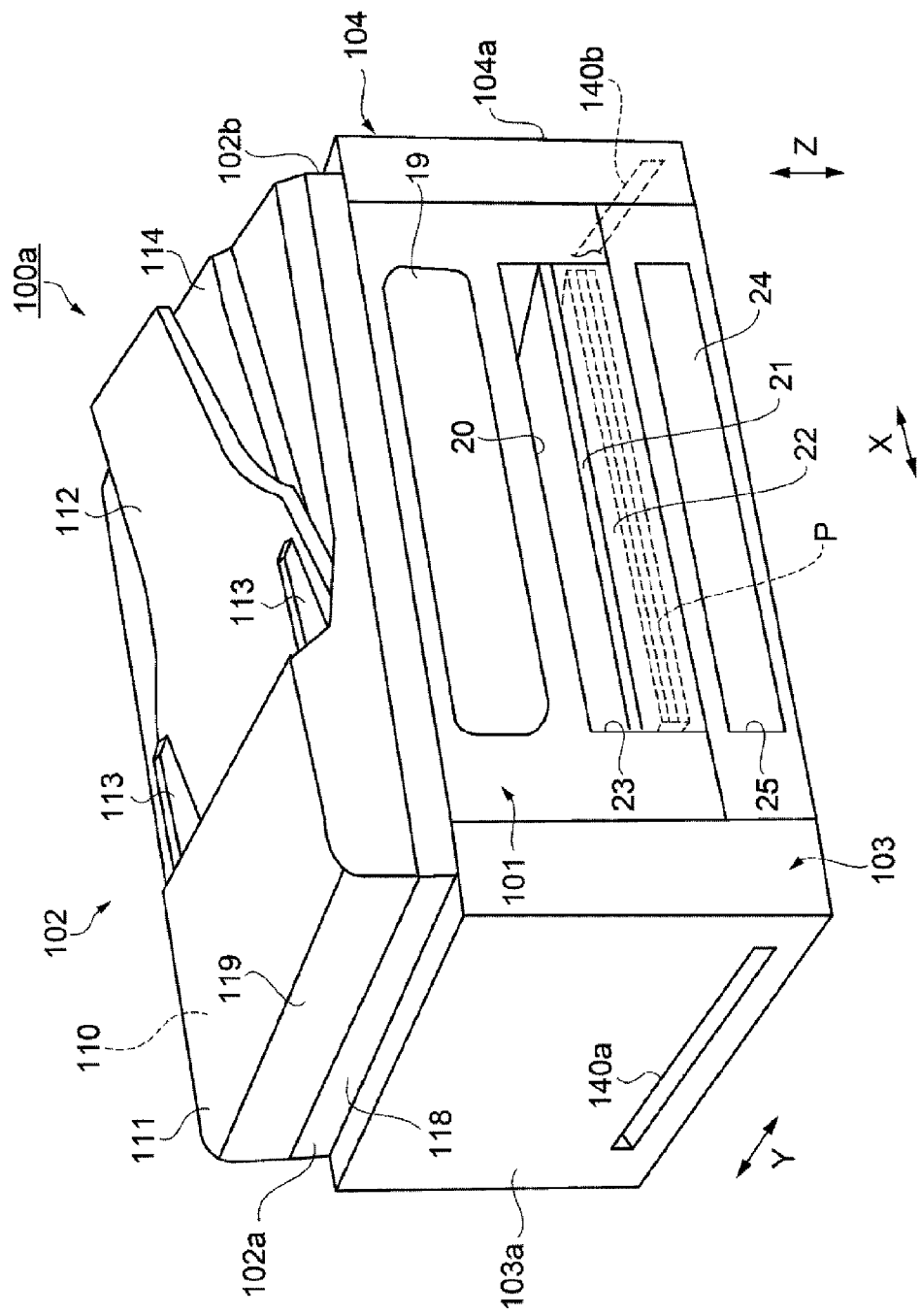
FIG. 25 is an outer appearance perspective view of the composite apparatus that is provided with a finger hooking portion.

FIG. 25 is an outer appearance perspective view of a composite apparatus 100a that is provided with finger hooking portions 140a and 140b in the composite apparatus 100 in FIG. 24. The finger hooking portions 140a and 140b may be respectively provided on the side portions of the liquid accommodating portions 103 and 104. Thereby, when the composite apparatus 100a is transported, the transporter is able to hook a finger to the finger hooking portions 140a and 140b and lift up the composite apparatus 100a.

When a hand is applied to the finger hooking portions 140a and 140b and lift up the composite apparatus 100a, the upper end portions of the liquid accommodating portions 103 and 104 are at positions that abut with the lower end portion of the fixing portion 118.

The weight of the liquid accommodating portions 103 and 104 in a state in which ink is accommodated is increased. In a case where the transporter hooks the hand to the finger hooking portions 140a and 140b and lifts up the composite apparatus 100a, it is possible to reduce shear stress applied to a joining portion such as a screw that joins the liquid accommodating portions 103 and 104 and the recording device 101 according to the weight of the liquid accommodating portions 103 and 104 in comparison to a case where the transporter hooks the hand to the recording device 101 and lifts up the composite apparatus 100a.

REFERENCE SIGNS LIST 11, 100 COMPOSITE APPARATUS
12, 101 RECORDING DEVICE
13, 102 READING DEVICE
14 RECORDING PORTION
15, 103, 104 LIQUID ACCOMMODATING PORTION
16a READING SURFACE
18 COVER MEMBER
33, 34 INK PACK AS EXAMPLE OF LIQUID ACCOMMODATING BODY
40 INK CARTRIDGE AS EXAMPLE OF LIQUID ACCOMMODATING BODY
41 INSERTION CASE
41a INSERTION PORT
42 ACCOMMODATING CASE
42a, 44a OPENING PORTION
43 LID
44 STORAGE CASE
110 TRANSPORT PORTION
135 READING PORTION
140a, 140b FINGER HOOKING PORTION
P PAPER SHEET AS EXAMPLE OF RECORDING MEDIUM
L1, L2, L3, L4 PROTRUSION AMOUNT
X WIDTH DIRECTION
Y DEPTH DIRECTION

The invention claimed is:

1. A composite apparatus comprising:
a recording device that has a recording portion which performs recording by ejecting liquid onto a recording medium;
a reading device that is disposed on the recording device and able to read an image; and
a liquid accommodating portion of which at least a part is disposed on a side portion of the recording device and which accommodates the liquid to be supplied to the recording portion,
wherein the reading device is disposed such that a part of the reading device protrudes from the recording device so as to be above and to partially cover the liquid accommodating portion.

2. The composite apparatus according to claim 1, wherein the liquid accommodating portion has a finger hooking portion which a finger hooks.

3. The composite apparatus according to claim 1, wherein the reading device has a transport portion that transports a document, and
a reading portion that reads an image of the transported document, and
the transport portion is positioned on the recording device.

4. The composite apparatus according to claim 1, wherein the size of the image that is able to be read by the reading device is larger than the size of the recording medium that is able to be recorded by the recording portion.

5. The composite apparatus according to any one of claims 1 to 4,
wherein the liquid accommodating portion is disposed on both side portions of the recording device in a width direction.

6. The composite apparatus according to claim 1, wherein the recording medium has a rectangular shape,
the recording device is configured to be able to set the recording medium in a positional state in which a depth direction of the recording device is a long side, and
the reading device is able to read the image with a rectangular shape which has an area that is two times the size of the recording medium and in which the width direction that is orthogonal to the depth direction of the recording device is a long side.

7. The composite apparatus according to claim 1, wherein an upper end portion of the liquid accommodating portion is a horizontal plane.

8. The composite apparatus according to claim 1, wherein the liquid accommodating portion is disposed on a rear side portion of the recording device.

9. The composite apparatus according to claim 1, wherein the liquid accommodating portion is provided with an insertion case that has an insertion port into which it is possible to insert a liquid accommodating body that accommodates the liquid, and
the insertion port is disposed on a side portion of the insertion case.

10. The composite apparatus according to claim 1, wherein the liquid accommodating portion is provided with an accommodating case that is able to accommodate the liquid accommodating body in which the liquid is accommodated and has an opening portion in a side portion, and a lid that is able to open and close the opening portion, and an opening and closing trajectory when the lid is opened and closed is separated from the reading device.

11. The composite apparatus according to claim 1, wherein the liquid accommodating portion is provided with a storage case that has the opening portion on the top side and is able to store the liquid accommodating body in which the liquid is accommodated, the reading device is provided with a reading surface on which the image is able to be read and a cover member that is able to displace between a first position at which the reading surface is covered and a second position at which the reading surface is exposed, and the cover member closes the opening portion when at the first position and opens the opening portion when at the second position.

12. The composite apparatus according to claim 5, wherein in the width direction, one liquid accommodating portion out of the liquid accommodating portions that are disposed on both side portions of the recording device is longer than the other liquid accommodating portion, and the protrusion amount of the reading device that protrudes from the recording device to above the one liquid accommodating portion is longer than the protrusion amount of the reading device that protrudes from the recording device to above the other liquid accommodating portion.

* * * * *